United States Patent
Finegold et al.

(10) Patent No.: US 12,415,522 B2
(45) Date of Patent: Sep. 16, 2025

(54) MOBILE PHONE APPLICATION AND GRAPHICAL USER INTERFACE FOR DETECTING AND VISUALIZING DRIVING EVENTS USING MOBILE PHONE SENSORS

(71) Applicant: Cambridge Mobile Telematics Inc., Cambridge, MA (US)

(72) Inventors: Rafi Finegold, Sharon, MA (US); Brad Cordova, Cambridge, MA (US); Joe Adelmann, Cambridge, MA (US); Philippe Bosshart, Cambridge, MA (US); Matt McClure, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 114 days.

(21) Appl. No.: 18/421,691

(22) Filed: Jan. 24, 2024

(65) Prior Publication Data

US 2024/0157950 A1    May 16, 2024

Related U.S. Application Data

(63) Continuation of application No. 17/195,561, filed on Mar. 8, 2021, now Pat. No. 11,951,994, which is a continuation of application No. 15/249,967, filed on Aug. 29, 2016, now Pat. No. 10,967,872.

(60) Provisional application No. 62/210,710, filed on Aug. 27, 2015.

(51) Int. Cl.
*B60W 40/09* (2012.01)
*H04M 1/725* (2021.01)

(52) U.S. Cl.
CPC ............ *B60W 40/09* (2013.01); *H04M 1/725* (2013.01)

(58) Field of Classification Search
CPC .. B60W 40/09; H04M 1/725; H04M 1/72454; H04M 1/72457; G01C 21/3667
See application file for complete search history.

(56) References Cited

U.S. PATENT DOCUMENTS

| | | | |
|---|---|---|---|
| 9,586,591 B1* | 3/2017 | Fields | G09B 5/00 |
| 10,349,219 B2 | 7/2019 | Cordova et al. | |
| 10,354,333 B1 | 7/2019 | Hayward | |
| 2013/0006674 A1* | 1/2013 | Bowne | G06Q 10/0833 |
| | | | 705/4 |
| 2014/0113619 A1* | 4/2014 | Tibbitts | G07C 5/0808 |
| | | | 455/419 |

(Continued)

OTHER PUBLICATIONS

U.S. Appl. No. 15/249,967, "Final Office Action", filed Aug. 10, 2018, 12 pages.

(Continued)

*Primary Examiner* — Behrang Badii
(74) *Attorney, Agent, or Firm* — Kilpatrick Townsend & Stockton LLP

(57) ABSTRACT

Embodiments of the present invention relate to transportation systems. More particularly, embodiments relate to methods and systems of vehicle data collection by a user having a mobile device. In a particular embodiment, vehicle movement data (also termed herein "driving data" or "data") is collected, analyzed and transformed, and combinations of collected data and transformed data are used in different ways, including, but not limited to, reporting and display of the combinations.

20 Claims, 22 Drawing Sheets

(56) References Cited

U.S. PATENT DOCUMENTS

| | | | |
|---|---|---|---|
| 2015/0264558 A1* | 9/2015 | Wigton ................ | G06V 40/193 |
| | | | 455/418 |
| 2016/0046298 A1* | 2/2016 | DeRuyck ............. | B60K 28/066 |
| | | | 340/576 |
| 2017/0057518 A1 | 3/2017 | Finegold et al. | |
| 2017/0132951 A1* | 5/2017 | Fields ................... | B60W 40/09 |

OTHER PUBLICATIONS

U.S. Appl. No. 15/249,967, "Final Office Action", filed Jan. 8, 2020, 12 pages.
U.S. Appl. No. 15/249,967, "Non-Final Office Action", filed Aug. 14, 2020, 12 pages.
U.S. Appl. No. 15/249,967, "Non-Final Office Action", filed Dec. 29, 2017, 11 pages.
U.S. Appl. No. 15/249,967, "Non-Final Office Action", filed Mar. 12, 2019, 11 pages.
U.S. Appl. No. 15/249,967, "Non-Final Office Action", filed May 23, 2017, 12 pages.
U.S. Appl. No. 15/249,967, "Notice of Allowance", filed Dec. 9, 2020, 17 pages.
U.S. Appl. No. 17/195,561, "Final Office Action", filed Aug. 2, 2023, 75 pages.
U.S. Appl. No. 17/195,561, "Non-Final Office Action", filed Mar. 31, 2023, 68 pages.
U.S. Appl. No. 17/195,561, "Notice of Allowance", filed Dec. 8, 2023, 20 pages.
Civil Action No. 22-1260-RGA, "Cambridge Mobile Telematics, Inc. v. Zendrive, Inc.", In the United States District Court for the District of Delaware, Report and Recommendation, Case 1:22-cv-01260-RGA, Document 35, p. ID #: 683, Jul. 28, 2023, pp. 1-28.

* cited by examiner

MOBILE PHONE APPLICATION AND GRAPHICAL USER INTERFACE FOR DETECTING AND VISUALIZING DRIVING EVENTS USING MOBILE PHONE SENSORS

CROSS-REFERENCES TO RELATED APPLICATIONS

This application is a continuation of U.S. patent application Ser. No. 17/195,561, filed Mar. 8, 2021; which is a continuation of U.S. patent application Ser. No. 15/249,967, filed Aug. 29, 2016, now U.S. Pat. No. 10,967,872, issued Apr. 6, 2021; which claims priority to U.S. Provisional Patent Application No. 62/210,710, filed on Aug. 27, 2015, the disclosures of which are hereby incorporated by reference in their entirety for all purposes.

BACKGROUND OF THE INVENTION

For many purposes, driving behavior has been a topic of interest. Some systems have been developed to track driving behaviors including speed and trip duration. External devices have been integrated with vehicles to track driving behavior. Some companies use a device that plugs into the on-board diagnostic port of a vehicle to read data from the vehicle's computer to better model risk.

Mobile devices, including smart phones, have been utilized to provide location information to users. Mobile devices can use a number of different techniques to produce location data. One example is the use of Global Positioning System (GPS) chipsets, which are now widely available, to produce location information for a mobile device.

SUMMARY OF THE INVENTION

Despite the progress made in relation to collecting data related to drivers and their driving behavior, there is a need in the art for improved methods and systems related to tracking driving using a mobile device.

Embodiments of the present invention relate to transportation systems. More particularly, embodiments relate to methods and systems of vehicle data collection by a user having a mobile device. In a particular embodiment, vehicle movement data (also termed herein "driving data" or "data") is collected, analyzed and transformed, and combinations of collected data and transformed data are used in different ways, including, but not limited to, reporting and display of the combinations.

One important use for collected, analyzed and transformed driving data is the categorization and output of the data. Some embodiments described herein break down collected driving data into discrete collections of data (e.g., trips) and categorize both the whole set of data and the discrete collections of data. Some embodiments analyze the driving data and identify specific events that are likely to have occurred during a drive, and the likely occurrence of these events are used by some embodiments to provide additional ways to group, categorize and/or output results.

According to some embodiments of the invention, a method of displaying vehicle movement information is provided. The method comprises obtaining a plurality of movement measurements from a mobile device in a vehicle during a drive. The method further comprises correlating a subset of the plurality of movement measurements to at least one event during the drive. The method further comprises generating a graphical image of the at least one event. The method further comprises displaying the graphical image.

According to some embodiments of the invention, a computer-program product is provided. The computer-program product is tangibly embodied in a non-transitory machine-readable storage medium, and includes instructions that, when executed by one or more processors, cause the one or more processors to perform the methods described herein.

These and other embodiments of the invention along with many of its advantages and features are described in more detail in conjunction with the text below and attached figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Embodiments of the present invention utilize mobile devices to provide information on a user's behaviors during transportation. For example, a mobile device carried by a user could be used to analyze driving habits.

As discussed below, some embodiments described herein use approaches to collecting and analyzing driving data similar to the approaches described in U.S. patent application Ser. No. 15/149,603, filed May 9, 2016, entitled "METHODS AND SYSTEMS FOR SENSOR-BASED VEHICLE ACCELERATION DETERMINATION," ("the '603 Application"), U.S. patent application Ser. No. 15/149,613, filed May 9, 2016, entitled "METHODS AND SYSTEMS FOR SENSOR-BASED DRIVING DATA COLLECTION" ("the '613 Application"), and U.S. patent application Ser. No. 14/749,232, filed Jun. 24, 2015, entitled "METHODS AND SYSTEMS FOR ALIGNING A MOBILE DEVICE TO A VEHICLE" ("the '232 Application"), these applications being incorporated by reference herein in their entirety for all purposes. Some embodiments described herein also use approaches to determining modes of transportation (also termed herein, "predicting modes of transportation/transit") similar to the approaches described in U.S. patent application Ser. No. 15/149,628, filed May 9, 2016, entitled "MOTION DETECTION SYSTEM FOR TRANSPORTATION MODE ANALYSIS" ("the '628 Application"), this application being incorporated by reference herein in its entirety for all purposes.

Specific examples of the use of different embodiments disclosed in these patent applications are provided herein, and one having skill in the relevant art(s), will appreciate how additional approaches described in these applications can be used in some embodiments described herein.

Figure 1:
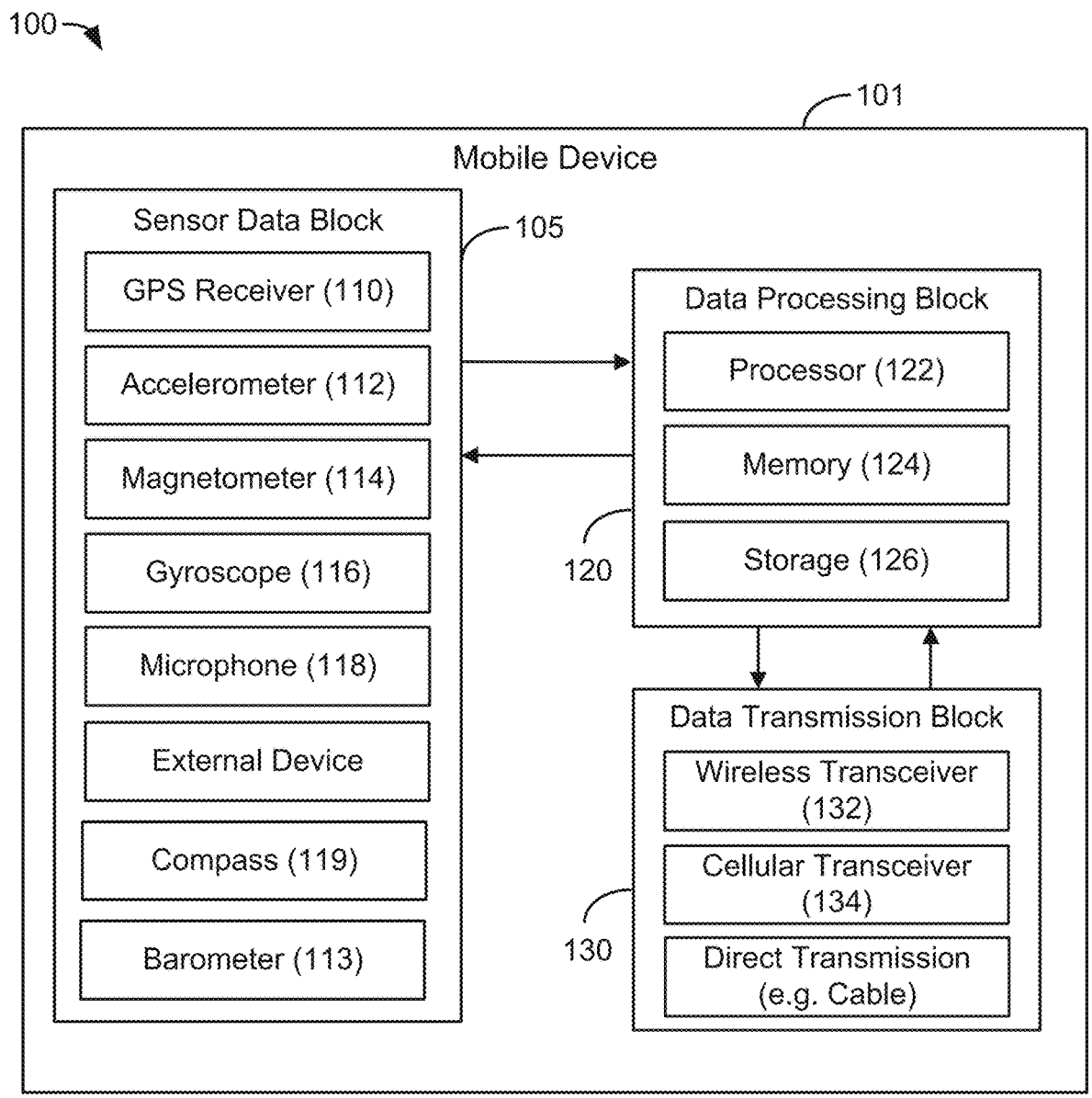
FIG. 1 is a simplified system diagram illustrating a driving behavior tracking system using a mobile device, according to an embodiment of the present invention.

FIG. 1 is a simplified system diagram illustrating a system 100 for collecting driving data according to an embodiment of the present invention. System 100 may include a mobile device 101 having a number of different components. In some embodiments, mobile device 101 includes a display (not shown) configured to present a graphical user interface (GUI). Mobile device 101 may also include a sensor data block 105, a data processing block 120, and a data transmission block 130. The sensor data block 105 may include data collection sensors as well as data collected from these sensors that are available to mobile device 101. This may include external devices connected via Bluetooth, USB cable, etc. The data processing block 120 may include storage 126, and manipulations done to the data obtained from the sensor data block 105. This may include, but is not limited to, subsampling, filtering, reformatting, etc. Data transmission block 130 may include any transmission of the data off the phone to an external computing device that may also store and manipulate the data obtained from sensor data block 105.

Some embodiments of the present invention are described using examples where driving data is collected using mobile devices 101, and these examples are not limited to any particular mobile device. As examples, a variety of mobile devices including sensors such as accelerometers 112, gyroscopes 116, compasses 119, barometers 113, location determination systems such as global positioning system (GPS) receivers 110, communications capabilities, and the like are included within the scope of the invention. Exemplary mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive" or "a trip". With many mobile devices 101, the sensors used to collect data are components of the mobile device 101, and use power resources available to mobile device 101 components, e.g., mobile device battery power and/or a data source external to mobile device 101.

Some embodiments use settings of a mobile device to enable different functions described herein. For example, in Apple IOS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing.

Figure 2:
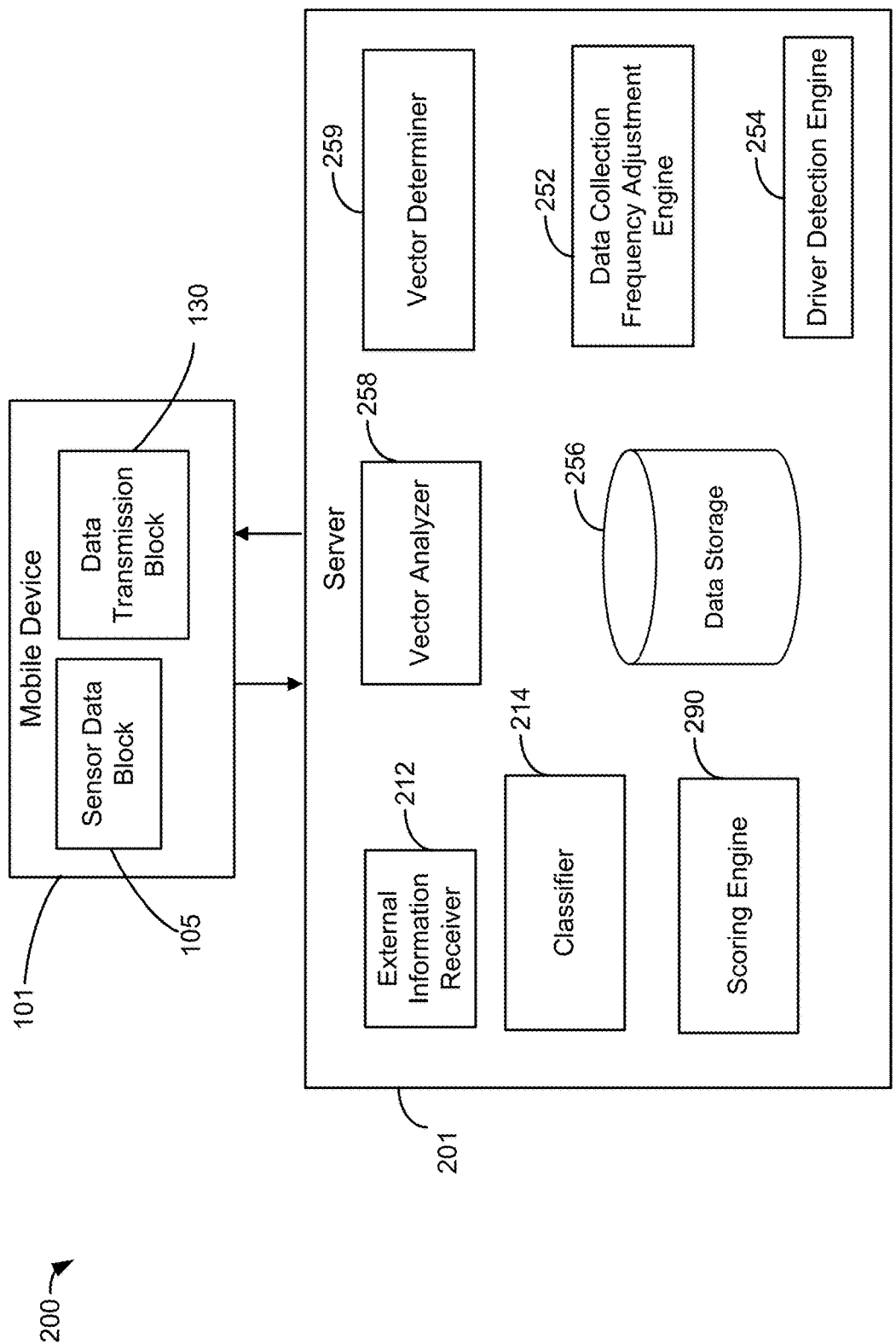
FIG. 2 is a simplified system diagram illustrating a driving behavior tracking system using a server and a mobile device, according to an embodiment of the present invention.

FIG. 2 shows a system 200 for collecting driving data also may include a server 201 that communicates with mobile device 101. In some embodiments, server 201 may provide functionality using components including, but not limited to: vector analyzer 258, vector determiner 259, external information receiver 212, classifier 214, data collection frequency engine 252, and driver detection engine 254. These components are executed by processors (not shown) in conjunction with memory (not shown). Server 201 may also include data storage 256. It is important to note that, while not shown, one or more of the components shown operating using server 201 can operate using mobile device 101, and vice versa.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive" or "a trip". An example of using components similar to data collection frequency engine 252 and driver detection engine 254 to operate mobile device 101 sensors is described in the '613 and '232 Applications listed above. Once the mobile device sensors have collected data (and/or in real time), some embodiments may analyze the data to determine acceleration vectors for the vehicle, as well as different features of the drive. Examples of processes to detect and classify driving features using classifier 214, and determine acceleration vectors using vector analyzer 258 and vector determiner 259, used by some embodiments are described in the '603 and '232 Applications listed above. As discussed with respect to FIG. 4 below, external data (e.g., weather) can be retrieved and correlated with collected driving data. Examples of using components similar to external information receiver 212 are described in the '232 Application.

As shown in FIGS. 3-23, in some embodiments, a display on a mobile device (such as mobile device 101) can show representations of driving data collected by embodiments, such representations being created by transforming collected sensor data (e.g., driving data collected using sensor data block 105) into different results, including, but not limited to, estimates of the occurrence of different driving events during a drive for which data was collected ("the drive"), a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data. Examples of collecting driving data using sensors of a mobile device are described herein and in the patent applications incorporated by reference herein. Examples of analyzing collected driving data to detect the occurrence of driving events are also described herein and in the patent applications incorporated by reference herein.

As discussed further below, some embodiments analyze collected driving data and assign scores to a drive, multiple drives, a driver and/or driving behavior based on different criteria. Some embodiments use scoring engine 290 to collect all the relevant data and rules, and generate scores for embodiments. In addition to the below, further disclosure regarding scoring can be found in U.S. Provisional Pat. App. No. 62/346,013, entitled "SYSTEMS AND METHODS FOR SCORING DRIVING TRIPS", filed Jun. 6, 2016, herein incorporated by reference in its entirety.

Figure 3:
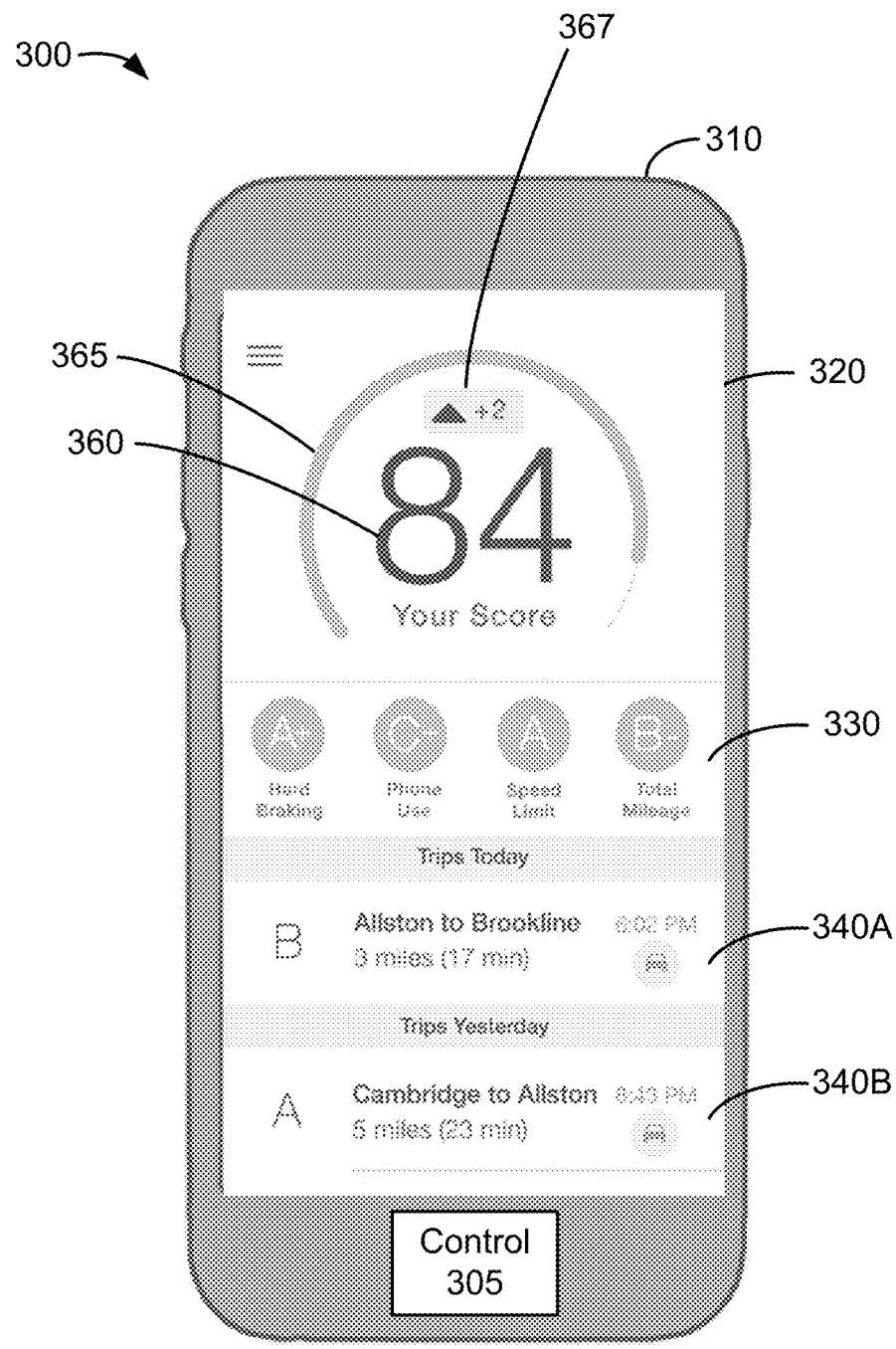
FIG. 3 is a system including a display presenting driving scores and score changes according to an embodiment of the present invention.

FIG. 3 is a system for displaying transformed driving data according to an embodiment of the present invention. System 300 includes mobile device 310 having a display 320 and a control 305. In some embodiments, mobile device 310 is similar to mobile device 101 discussed with respect to FIG. 1 above. Control 305 (e.g., a "home button"), as well as a touch screen component associated with display 320 (not shown), can be used to display and select transformed driving data, in different embodiments.

In an example depicted in FIG. 3, display 320 shows an score display for a driver composed of multiple graphical and textual elements, including driver score 360 ("Your Score"), driver score graphic 365, and score change 367. In some embodiments, the scores assigned (also termed "grades" in embodiments) are color coded to show a visual indication of the value of a score (e.g., shades of green for a high score and shades of red for a low score, or any other color scheme). As noted above in the description of FIG. 2, scores for driving behavior (including, for example, driver score 360), are determined by collecting and transforming driving data collected by mobile device 310. It should be appreciated that the scores (also termed herein, grades, metrics, categories, etc.) and/or other similar values discussed herein, can be represented in any fashion, e.g., as a number, letter, graphical object, value, and/or any other indicator.

Driver score graphic 365, as well as the use of colors shown on display 320 to emphasize information, are examples of approaches used by some embodiments to display combinations of driving data and transformed driving data. Driver score graphic 365, for example, can be used to graphically show how close the displayed driver score 360 is to a maximum value (e.g., 84/100 yields a partial circle that takes up 84% of the available progress bar space.

Event or behavior scores 330 for particular events occurring during a drive are also included. In some embodiments, the occurrence of certain events or driving behaviors (e.g., hard braking, hard turning, speeding, using a phone while driving, etc.) is relevant to a risk model for the driver. Based on an analysis of driving data with respect to certain events, event scores 330 can give an indication of driver ability in these areas. Specific events for which scores have been assigned and displayed (e.g., behavior scores 330) are discussed with respect to FIG. 4 below. In some embodiments, driver score 360 is determined based on analyzing and/or weighing behavior scores 330 to determine an overall driver score 360. Some embodiments display an indication (e.g. change 367) of a change in overall driver score 360 from a last period (e.g., the last trip, the cumulative previous trips, etc.) or any other defined interval.

Some embodiments collect, and display the analysis of, multiple collections of driving data samples. For example, as shown in FIG. 3, driving data is collected and grouped into two "trips" (e.g., Allston to Brookline, trip 340A, and Cambridge to Allston, trip 340B). Individual driving scores may be separately assigned for each trip, and/or aggregated to determine the overall driver score 360 in some embodiments.

Figure 18:
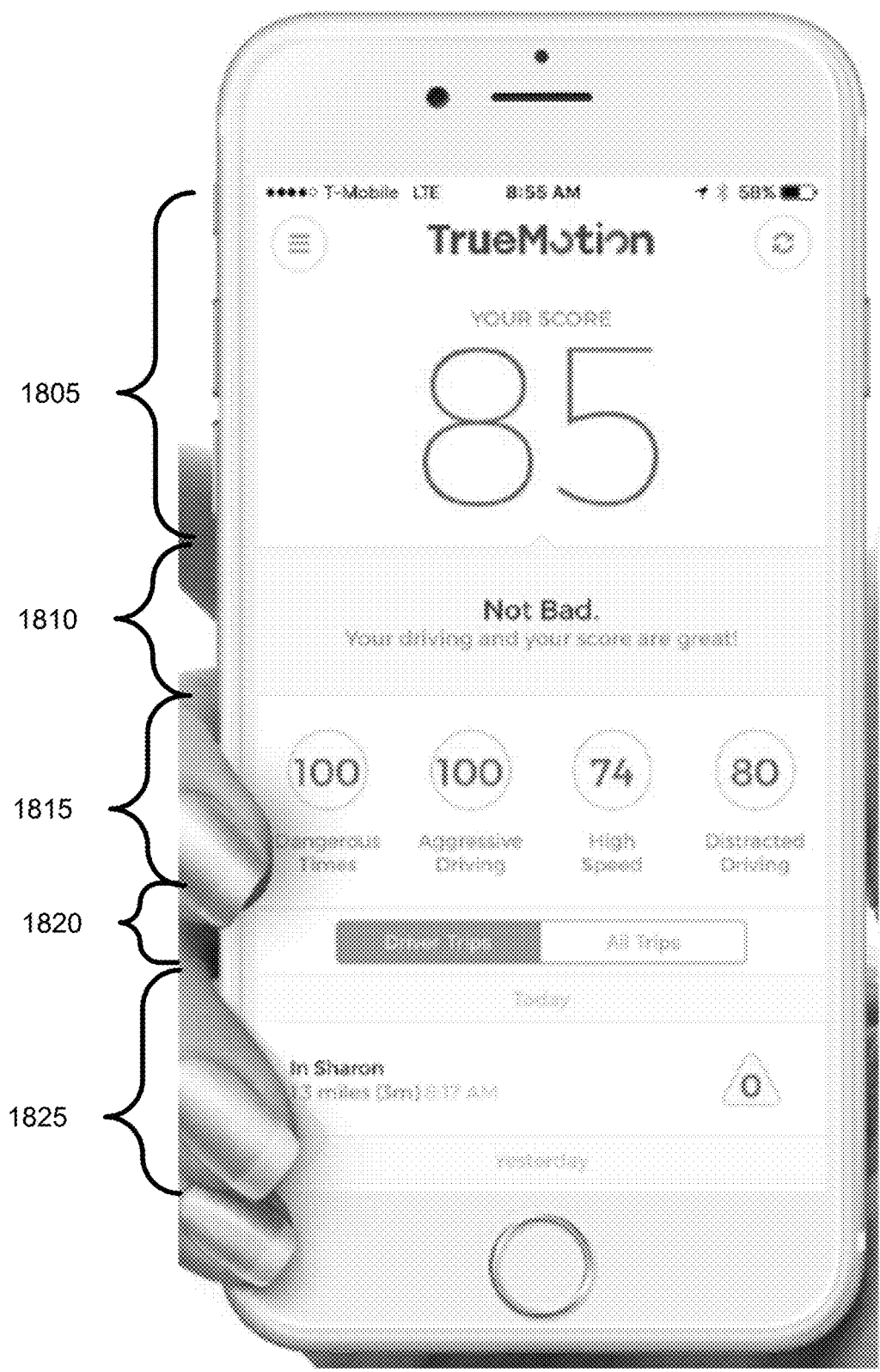
FIG. 18 is an exemplary display presenting an overall driving score and overall driving behavior scores according to an embodiment of the present invention.

The data presented in FIG. 3 may be presented in any suitable manner. For example, FIG. 18 is an alternative exemplary display presenting an overall driving score and overall driving behaviors scores according to an embodiment of the present invention. FIG. 18 may include an overall driver score 1805, commentary 1810 on the overall driver score 1805, driving behavior scores 1815, trip selector 1820, and trip list 1825.

Overall driver score 1805 may be similar to overall driver score 360 of FIG. 3. Commentary 1810 may be generated and displayed based on overall driver score 1805, and may take into account the overall driver scores for other drivers as compared to overall driver score 1805. Driving behavior scores 1815 may be similar to driving behavior scores 330 of FIG. 3, although they may reflect the same or different driving behaviors. For example, driving behavior scores 1815 reflect scores for "dangerous times", "aggressive driving", "high speed", and "distracted driving".

Trip selector 1820 may allow a user to select between "Driver Trips", which will display all trips taken by the user in which the user was a driver, and "All Trips", which will display all trips taken by the user regardless of whether or not the user was a driver. In the example shown in FIG. 18, "Driver Trips" is selected, a trip list 1825 is displayed. Trip list 1825 reflects that the user took one 1.3 mile trip today within Sharon at 8:17 AM.

Figure 19:
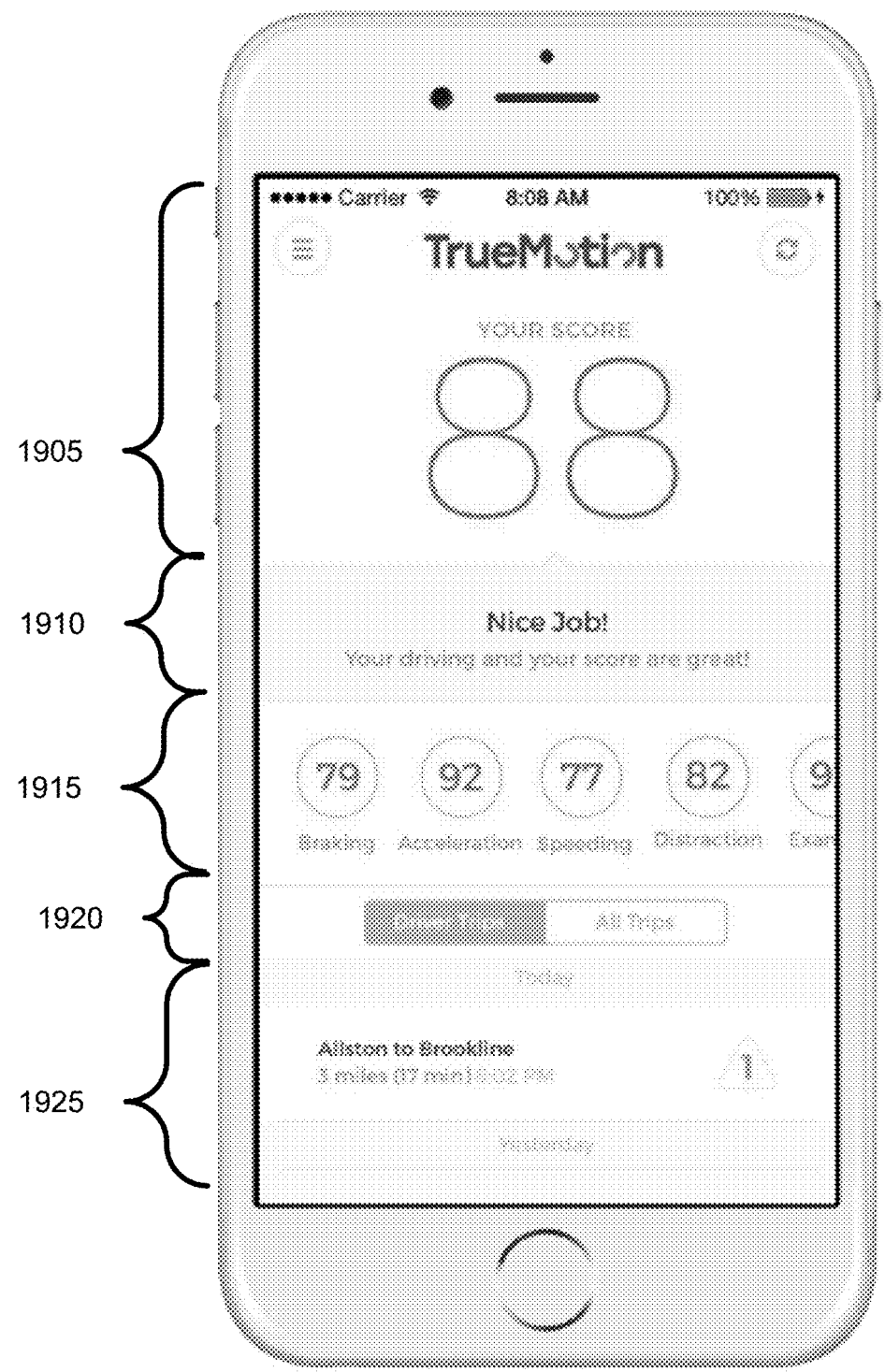
FIG. 19 is an exemplary display presenting an overall driving score and other overall driving behavior scores according to an embodiment of the present invention.

FIG. 19 is another alternative exemplary display presenting an overall driving score and other overall driving behaviors scores according to an embodiment of the present invention. FIG. 19 may include an overall driver score 1905, commentary 1910 on the overall driver score 1905, driving behavior scores 1915, trip selector 1920, and trip list 1925.

Overall driver score 1905 may be similar to overall driver score 1805 of FIG. 18. Commentary 1910 may be generated and displayed based on overall driver score 1905, and may take into account the overall driver scores for other drivers as compared to overall driver score 1905. Driving behavior scores 1915 may be similar to driving behavior scores 1815 of FIG. 18, although they may reflect the same or different driving behaviors. For example, driving behavior scores 1915 reflect scores for "braking", "acceleration", "speeding", and "distraction".

Trip selector 1920 may allow a user to select between "Driver Trips", which will display all trips taken by the user in which the user was a driver, and "All Trips", which will display all trips taken by the user regardless of whether or not the user was a driver. In the example shown in FIG. 19, "Driver Trips" is selected, a trip list 1925 is displayed. Trip list 1925 reflects that the user took one 3 mile trip today from Allston to Brookline at 6:02 PM.

Figure 20:
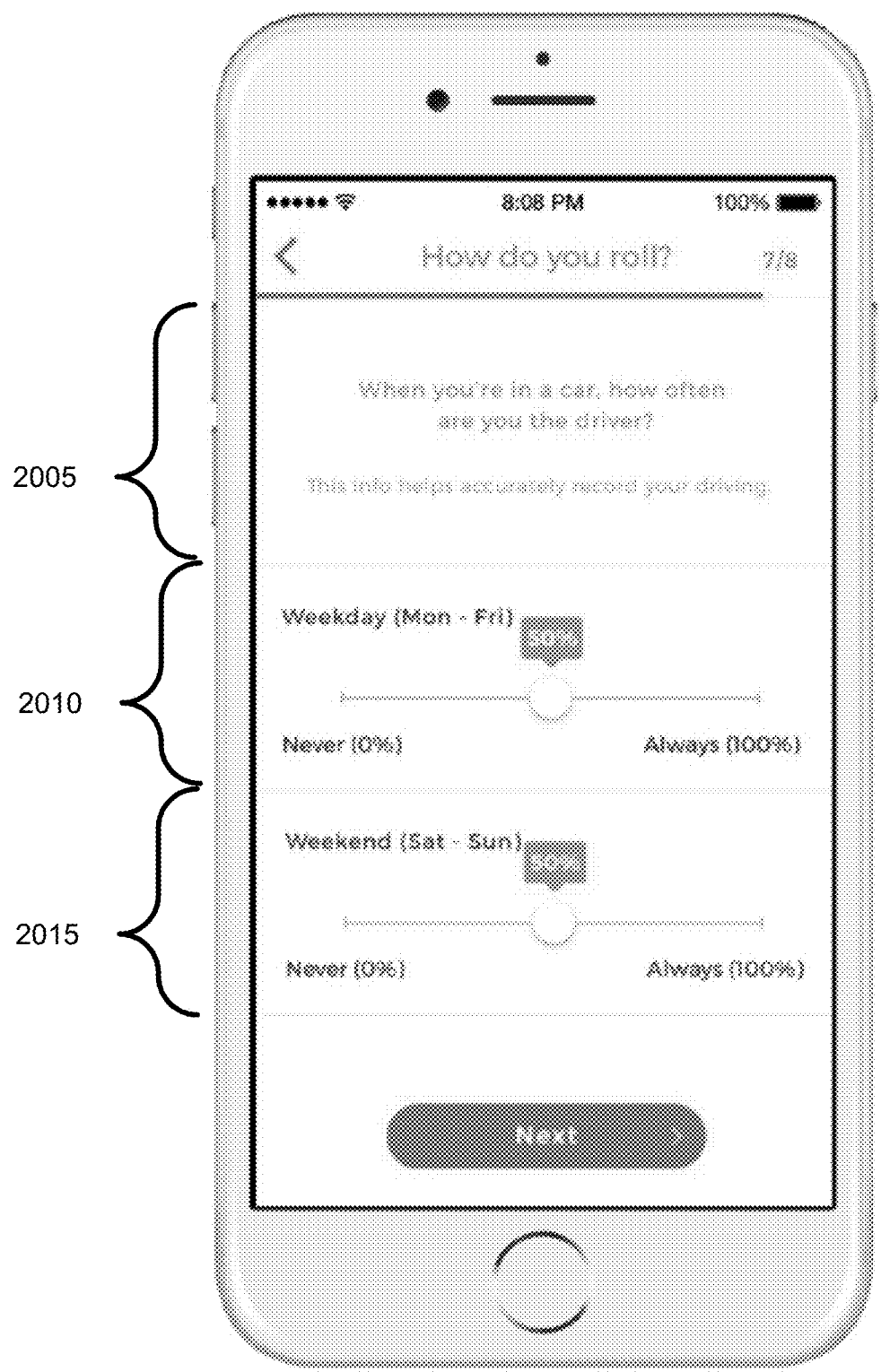
FIG. 20 is an exemplary display presenting a driver survey according to an embodiment of the present invention.

In some embodiments of the invention, only trips in which the user of the mobile device is a driver are used to calculate driver scores, trip scores, and/or driving behavior scores. Various techniques may be used to determine whether the user of a mobile device is a driver on a trip, such as is described in U.S. Pat. No. 9,398,423, entitled "METHODS AND SYSTEMS FOR DRIVER IDENTIFICATION", issued Jul. 19, 2016, herein incorporated by reference in its entirety. One specific technique for identifying a user of a mobile device as a driver involves presenting a survey to a mobile device user, as shown in FIG. 20. As shown in FIG. 20, the user is presented with question 2005: "When you're in a car, how often are you the driver?". The user may toggle between a 0% driving rate and a 100% driving rate for the weekdays 2010 and the weekends 2015. This data may then be submitted and analyzed to refine a driver prediction. This technique is described further in U.S. Provisional Pat. App. No. 62/320,226, entitled "SYSTEMS AND METHODS FOR INDIVIDUALIZED DRIVER PREDICTION", filed Apr. 8, 2016, herein incorporated by reference in its entirety.

Figure 4:
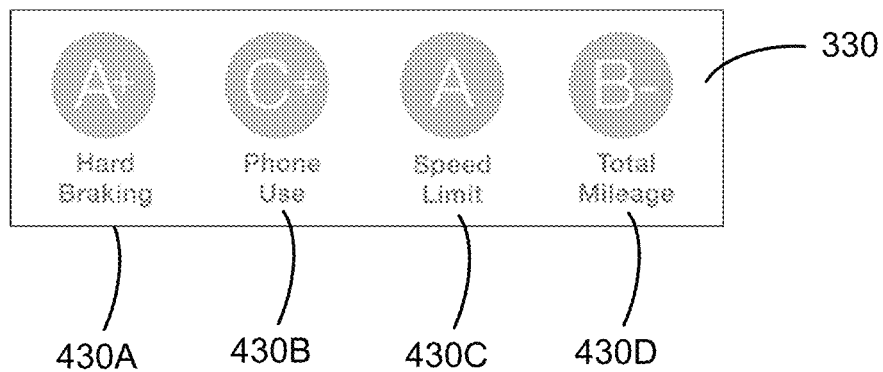
FIG. 4 is an exemplary display presenting specific driving behavior scores according to an embodiment of the present invention.

FIG. 4 is a more detailed example of displaying specific driving behavior scores according to an embodiment of the present invention. The occurrence of certain events while a driver is driving are considered relevant for assessing the overall ability of a driver. As described herein, the occurrence of certain driving events while a driver is driving (e.g., hard braking and the like) can be termed "driving behavior." Some embodiments assign scores to particular driving behaviors based on the detected occurrence of certain driving events.

In some embodiments, specific driving behaviors for which scores have been assigned and displayed (e.g., behavior scores 330) include hard braking 430A (also termed by some embodiments as "rapid deceleration"), phone usage 430B, operated speed relative to the posted speed or maximum speed limit 430C, and total mileage 430D.

In some embodiments discussed herein, hard braking 430A refers to an action causing a vehicle to rapidly decelerate at a pace greater than a threshold, for example, at a pace greater than 7 miles per hour per second.

In some embodiments discussed herein, phone usage 430B refers to the action of using a mobile device in a telephone mode to make a phone call. In some embodiments, the mobile device being unlocked, and the screen displaying output is determined as use of the mobile device. In some embodiments, this use of the mobile device can include operating applications ("apps") on the mobile device and/or sending text messages. In some embodiments, using apps and/or text messaging are separately detected by mobile device 101 sensors, and can be separately scored (e.g., appear in behavior scores 330). For the usage examples discussed above, as well as other similar uses of the mobile device, the usage can be assessed and one or more metrics can be determined for the various distracted driving activities, e.g., an assessment of the distraction potential of the activity. For example, metrics can be separately determined and displayed for handheld calling and phone interaction, as described further herein with respect to FIG. 23. These metrics can be used by some embodiments in the categorizing of driving behavior.

In some embodiments discussed herein, speed limit 430C refers to the operation of a vehicle at a speed relative to the posted speed or maximum speed associated with a road (also termed herein as "excessive speed").

In some embodiments discussed herein, total mileage 430D refers to the amount of miles driven by the driver over a period of time, e.g., a month, a year, or any other time period. When creating risk profiles for a driver, this factor can be a useful predictor of risk (e.g., more driving can cause a higher likelihood of an accident).

In some embodiments discussed herein, excessive lateral acceleration (not shown) refers to a vehicle to changing directions with lateral forces above a particular threshold (also termed herein "hard cornering"). These lateral forces can indicate higher stress on the car and driver, and can lead to a higher likelihood of an accident. An example of determining lateral acceleration (e.g., to determine hard cornering) of a vehicle using driving data collected by mobile device sensors is described in the '603 Application.

It is important to note that, while in embodiments described herein, the "driving behavior" discussed refers to human actions while driving, the operation of a vehicle by an automated process (e.g., a self-driving car), can also be analyzed by some embodiments.

Some embodiments analyze and assess combinations of the occurrence of events with other information sources. One having skill in the relevant art(s), given the description herein will appreciate that different combinations of mobile device sensor data can be combined with data from other sources to generate a variety of driving behavior assessments. For example, the metrics discussed herein that are measurements of basic driving safety (e.g., hard braking, hard cornering, excessive speed, and/or similar measurements) can be combined with external data sources (also termed "contextual data sources" in embodiments), for example, time of day, weather, traffic, and/or other similar sources. In some embodiments, contextual data retrieved can include characteristics of geographical areas, e.g., school zones, residential neighborhoods, hospital zones, city streets, and/or other similar characteristics.

In some embodiments, collected driving data can be correlated with GPS data and/or contextual data to allow driving behavior to be assessed in different locations (e.g., in a school zone, on residential streets, in parking lots, and/or other similar data) to generate different scores for subsets of driving behavior, such as driving in bad weather, driving in school zones, etc. In addition to the movement sensor data and external data sources discussed, other mobile device sensors can be used, e.g., microphone 118 of mobile device 101 can measure the ambient sound level in a vehicle, and driving data can be correlated with these measurements to generate scores, for example, for driving in a vehicle where the driver is exposed to excessive noise. In another example, a light sensor in a mobile device 101 can be used to determine the extent to which lights are on inside a vehicle while driving at night, and a score can be determined for the night driving skills of a driver. For example, having too much light inside an automobile at night can obscure features outside, and thus a particular drive may receive a lower score when this is detected by embodiments.

In some embodiments, for different driving behaviors, a particular type of driving can be identified, scored and highlighted in an interface. Examples of different behaviors for which scores can be generated include, but are not limited to speed in school zones, hard braking in icy conditions, hard cornering that occurs while speeding, behavior during night drives, and/or other combinations. Other useful scores include texting while speeding, using apps while hard cornering, and periods of detected distraction (e.g., phone, text, apps) that culminate in a hard braking event. It should be appreciated that, for all of these scores, including the complex scores, a full explanation of the driving behavior, along with improvement information can be offered by some embodiments.

It is important to note that the driving behavior scores (e.g., 430A-D) can be generated overall for a driver (for all driving, or driving over a period of time), and/or for the driver for individual trips. A driver, for example, may have an overall "A" score for speed limit 430C, but on a particular trip, a lower grade (e.g., a "C") could be assigned based on driving behavior during the trip (e.g., exceeding posted speed limits, rapid acceleration, and/or the like). This lower score may act to reduce the overall score of the driver.

Figure 5:
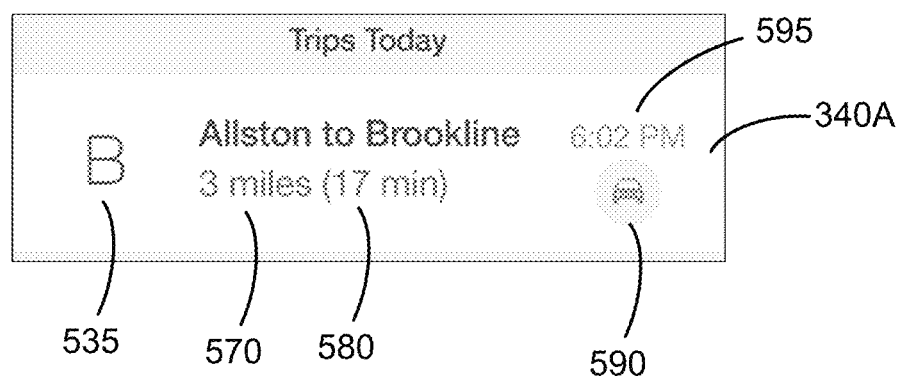
FIG. 5 is an exemplary display presenting a driving score for a specific trip according to an embodiment of the present invention.

FIG. 5 is an exemplary display presenting a driving score for a specific trip according to an embodiment of the present invention. Continuing the example from FIG. 3, for trip 340A, movement sample collection begins when the vehicle begins a drive in Allston. The data collection continues until the vehicle ends the drive in Brookline (e.g., 3 miles 570 and 17 minutes 580 later). The data from this trip 340A may be analyzed and a score may be given for the entire trip (e.g., a "B" trip score 535). The number of minutes 580, and the start time of the trip are also shown (e.g., 6:02 PM time 595).

In some embodiments, the mode of transportation (also termed herein "mode of transit") of a trip is estimated based on the collected driving data. In FIG. 5, for example, the mode of transportation for the trip was determined to be an automobile, and this is indicated by automobile 590 graphic. The '628 Application describes approaches to transportation mode determination that can be used by some embodiments described herein.

Figure 6:
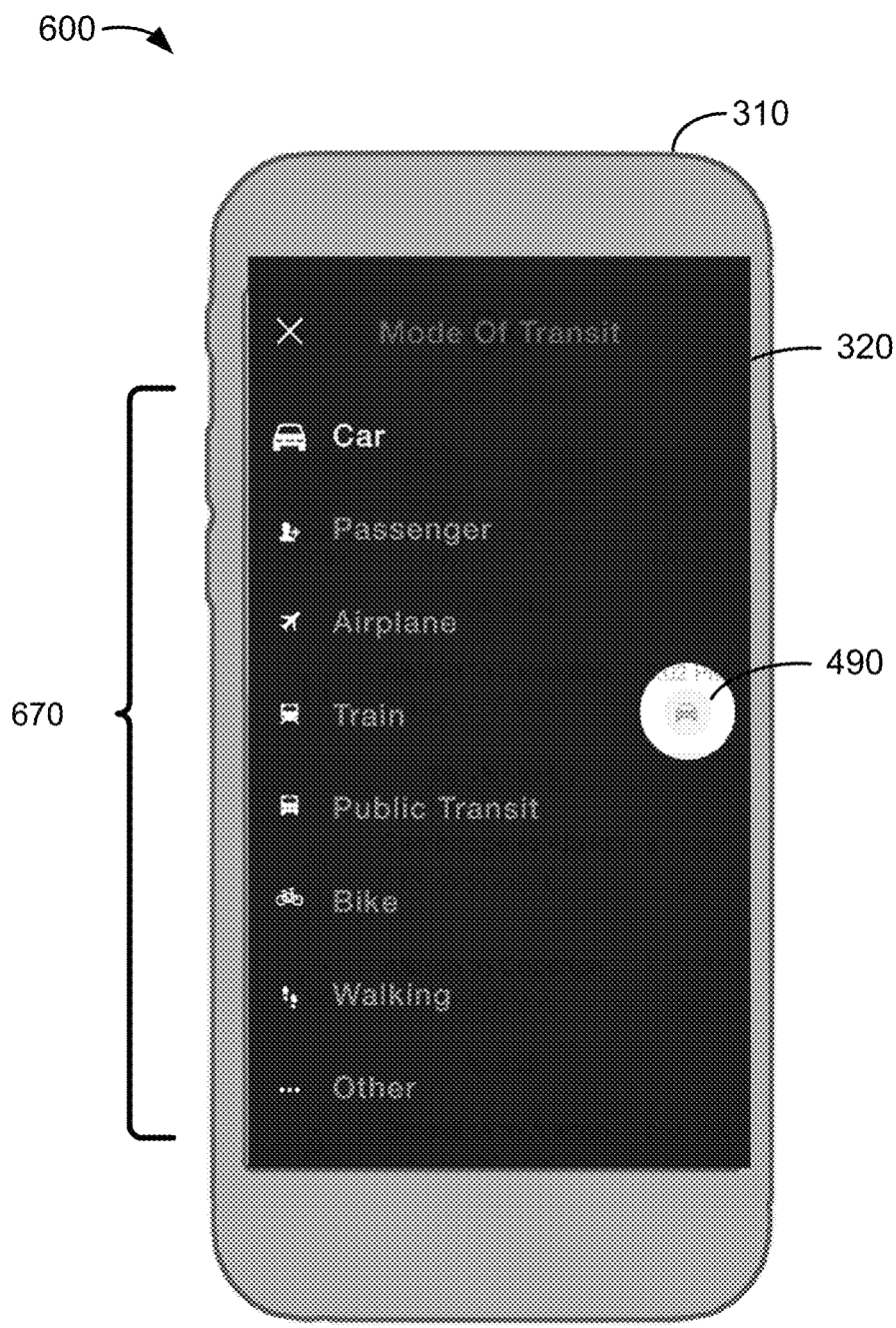
FIG. 6 is an exemplary display presenting modes of transit according to an embodiment of the present invention.

FIG. 6 is an exemplary display of different modes of transportation for which data can be collected by some embodiments. List 670 shows a list displayed, in some embodiments, by selecting a mode associated with a trip (e.g., in FIG. 5, mode icon 590 shows an automobile mode of transportation associated with trip 350). The modes displayed in list 670 can, in some embodiments, be selected to enable the correction of a determined transportation mode. If trip 350 was actually performed using a different mode of transportation (e.g., driving a truck instead of an automobile, riding in a bus, riding on a train, riding in an airplane, riding a bike, walking, etc.), mode icon 590 can be selected to enable the selection of the proper mode of transit from list 670. Mode icon 590 may also be selected to enable the selection of the trip as an automobile trip in which the user of the mobile device was a passenger instead of a driver. Thus, the trip in which the user was a passenger may be excluded from calculating driving scores in some embodiments.

Figure 7:
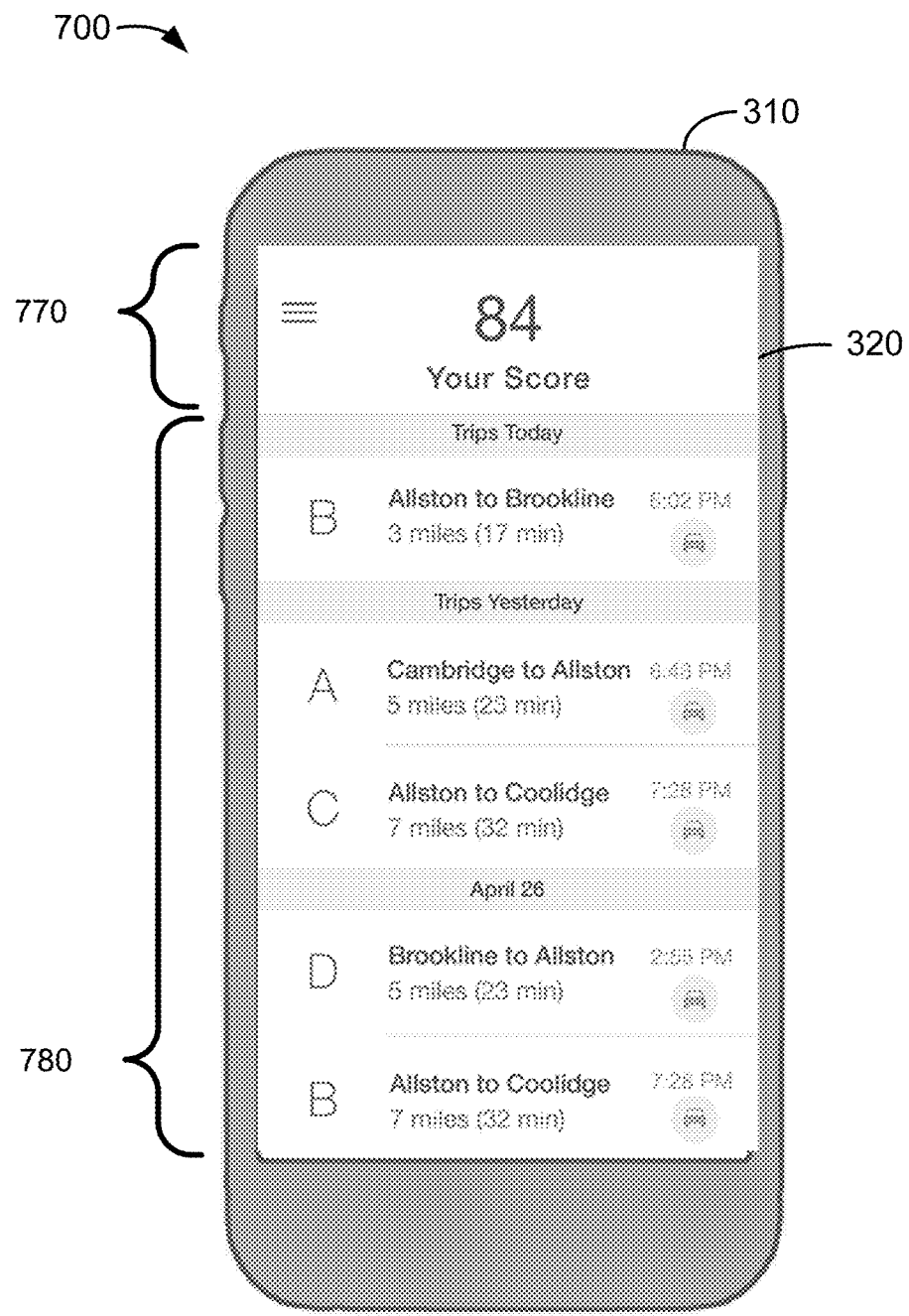
FIG. 7 is an exemplary display presenting driving scores for multiple trips according to an embodiment of the present invention.

FIG. 7 is an exemplary display 700 presenting driving scores for multiple trips according to an embodiment of the present invention. Driver score 770 ("Your Score") is, in some embodiments, an overall score for a driver, and is similar to driver score 360 shown on FIG. 3. List 780 is a list of trips recorded, along with the information discussed with FIG. 5. It is important to note that display features can be arranged in different positions, without departing from the spirit of embodiments.

Figure 21:
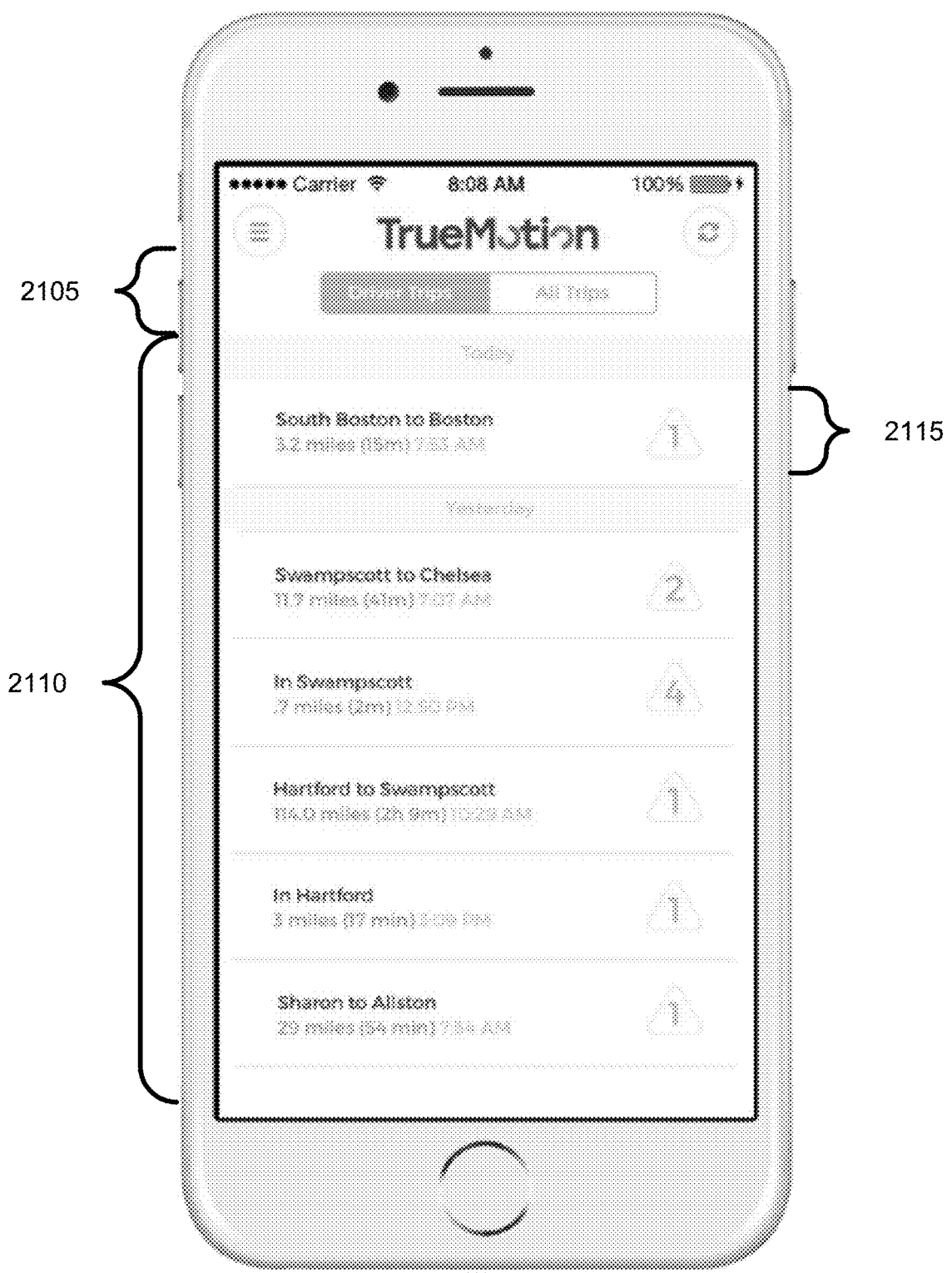
FIG. 21 is an exemplary display presenting multiple driver trips according to an embodiment of the present invention.

FIG. 21 is an alternative exemplary display presenting multiple driver trips according to an embodiment of the present invention. In FIG. 21, trip selector 2105 has "Driver Trips" selected; thus, trip list 2110 only includes trips in which the user of the mobile device was a driver. Trip list 2110 includes trip 2115, for example. Trip 2115 is displayed as a 3.2 mile trip from South Boston to Boston at 7:53 AM today.

Figure 8:
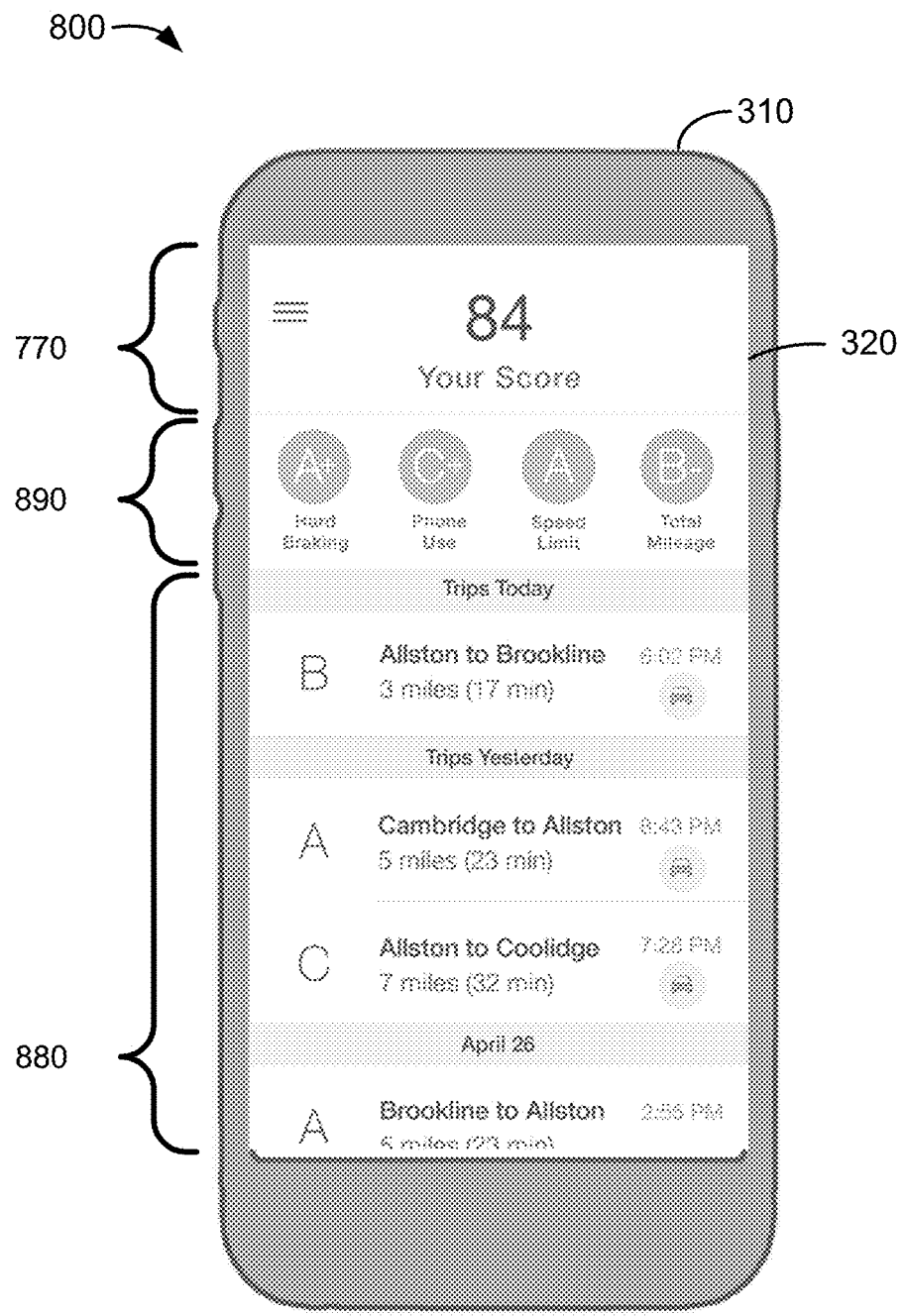
FIG. 8 is an exemplary display presenting an overall driving score, specific driving behavior scores, and driving scores for specific trips according to an embodiment of the present invention.

FIG. 8 is an exemplary display 800 presenting an overall driving score, specific driving behavior scores 890, and driving scores for specific trips 880 according to an embodiment of the present invention. In the example shown on FIG. 8, the driving data displayed with respect to FIG. 7 (i.e., driver score 770, list 780) have driving behavior subsets 890 included, these subsets being similar to those discussed with FIG. 4 above. In some embodiments, this display is enabled by reducing the size allocated to trip display (e.g., trips 780 resized to trips 880) and using the space opened up to display additional driving information (e.g., individual driving behavior scores 890).

Figure 9:
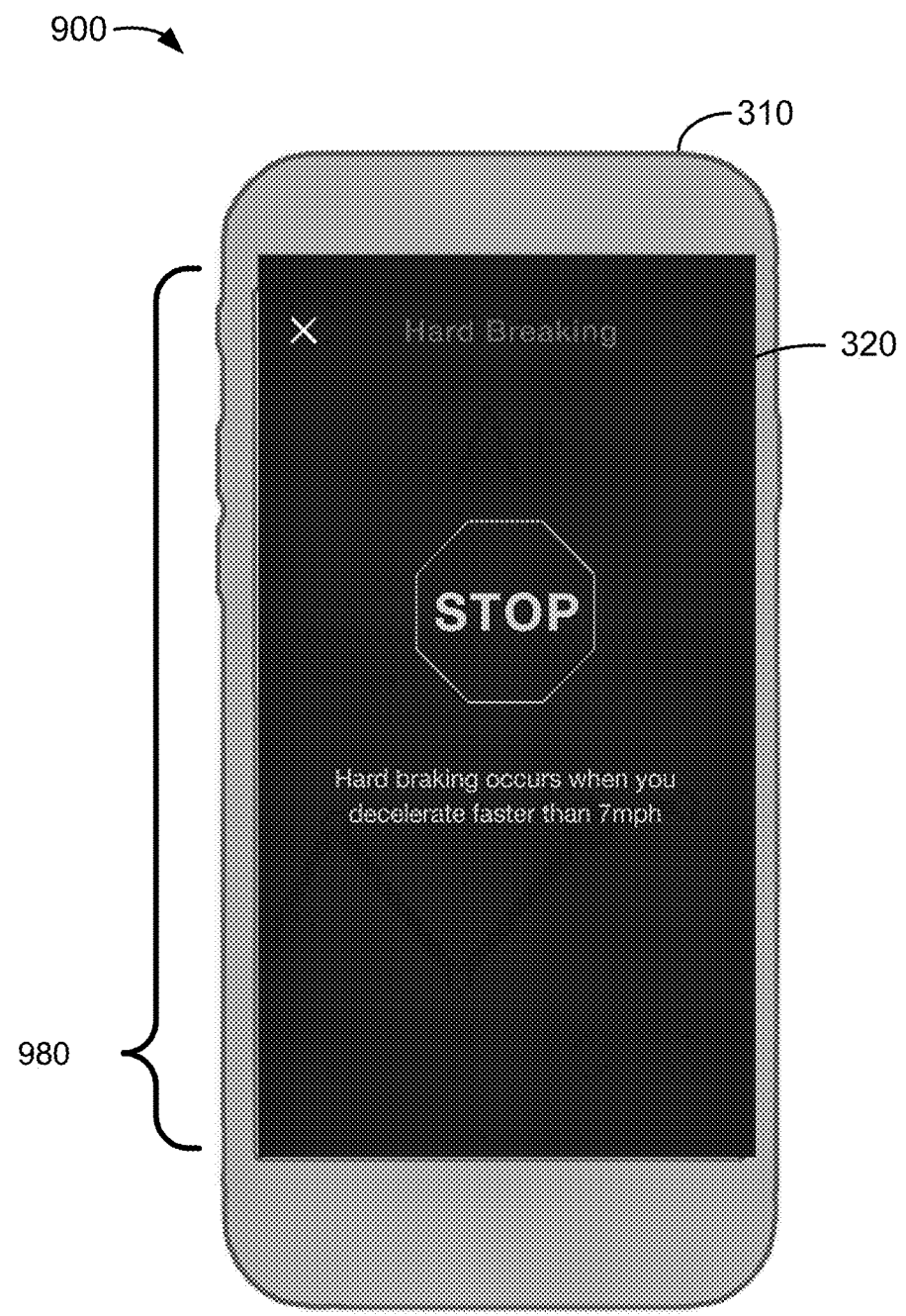
FIG. 9 is an exemplary display presenting a hard braking warning according to an embodiment of the present invention.

FIG. 9 is an exemplary display 900 presenting a hard braking warning according to an embodiment of the present invention. In some embodiments, information about the analysis of driving data is available upon request, e.g., by selecting a user interface element. For example, in some embodiments, selecting a driving behavior 890 displayed (e.g., hard braking 430A from FIG. 4) can display an explanation of the driving behavior, e.g., explanation 980. In some embodiments, the information displayed is responsive to analysis algorithms used by embodiments that can be changed. For example, in explanation 980, the statement "Hard braking occurs when you decelerate faster than 7 mph" includes a "7 mph" threshold that may be different in different embodiments and/or different settings set in the same embodiment. When this threshold changes, explanation 980 can be automatically updated by some embodiments to display the current threshold value. In some embodiments, the threshold may cause explanation 980 to automatically display, with or without other indicators (e.g., an audio alert, a vibration, etc.). Further discussion regarding alerts based on driving behaviors may be found in U.S. Provisional Pat. App. No. 62/286,218, entitled "SYSTEMS AND METHODS FOR DETECTING AND MODIFYING DRIVING BEHAVIORS", filed Jan. 22, 2016, herein incorporated by reference in its entirety. In some embodiments, other approaches can be used to present explanations of different aspects of data collection and analysis.

Figure 23:
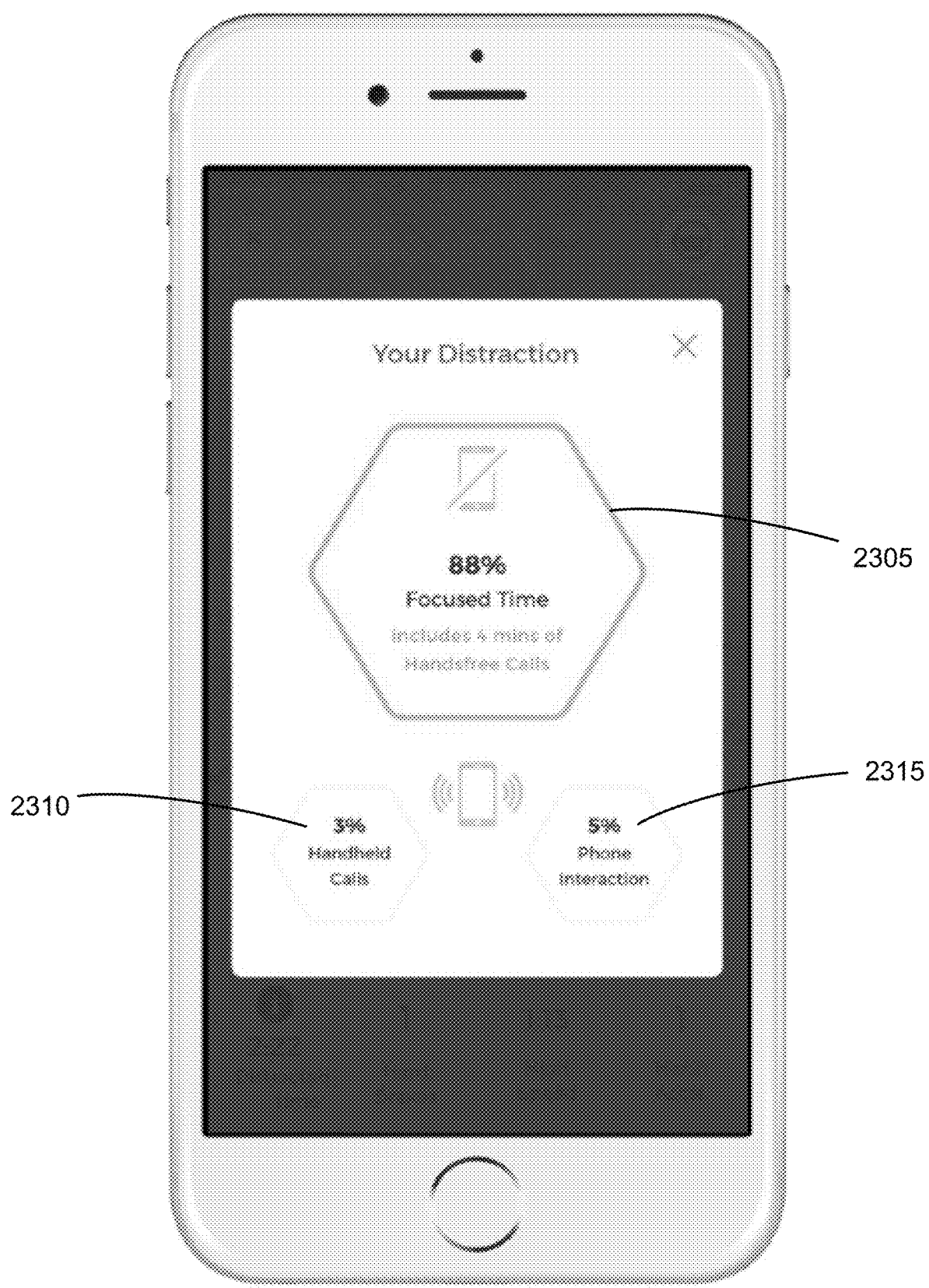
FIG. 23 is an exemplary display presenting distracted driving metrics according to an embodiment of the present invention.

Information about a drive, a driver, and/or driving behaviors may be displayed and/or communicated at any time during or after a drive and in any format. For example, FIG. 23 is an exemplary display presenting distracted driving metrics according to an embodiment of the present invention. The distracted driving metrics shown in FIG. 23 may be presented after a drive has ended, for example, so as not to further distract the driver. As shown in FIG. 23, a focused time metric 2305 may be displayed. For example, the focused time metric 2305 may indicate that the driver was focused on driving during 88% of the drive, including during 4 minutes of hands free calling. A handheld call metric 2310 may also be displayed. For example, the handheld call metric 2310 may indicate that the driver was on handheld calls for 3% of the drive. A phone interaction metric 2315 may also be displayed. The phone interaction metric 2315 may indicate that the driver was interacting with the mobile device (e.g., typing, text messaging, etc.) during 5% of the drive.

Figure 10:
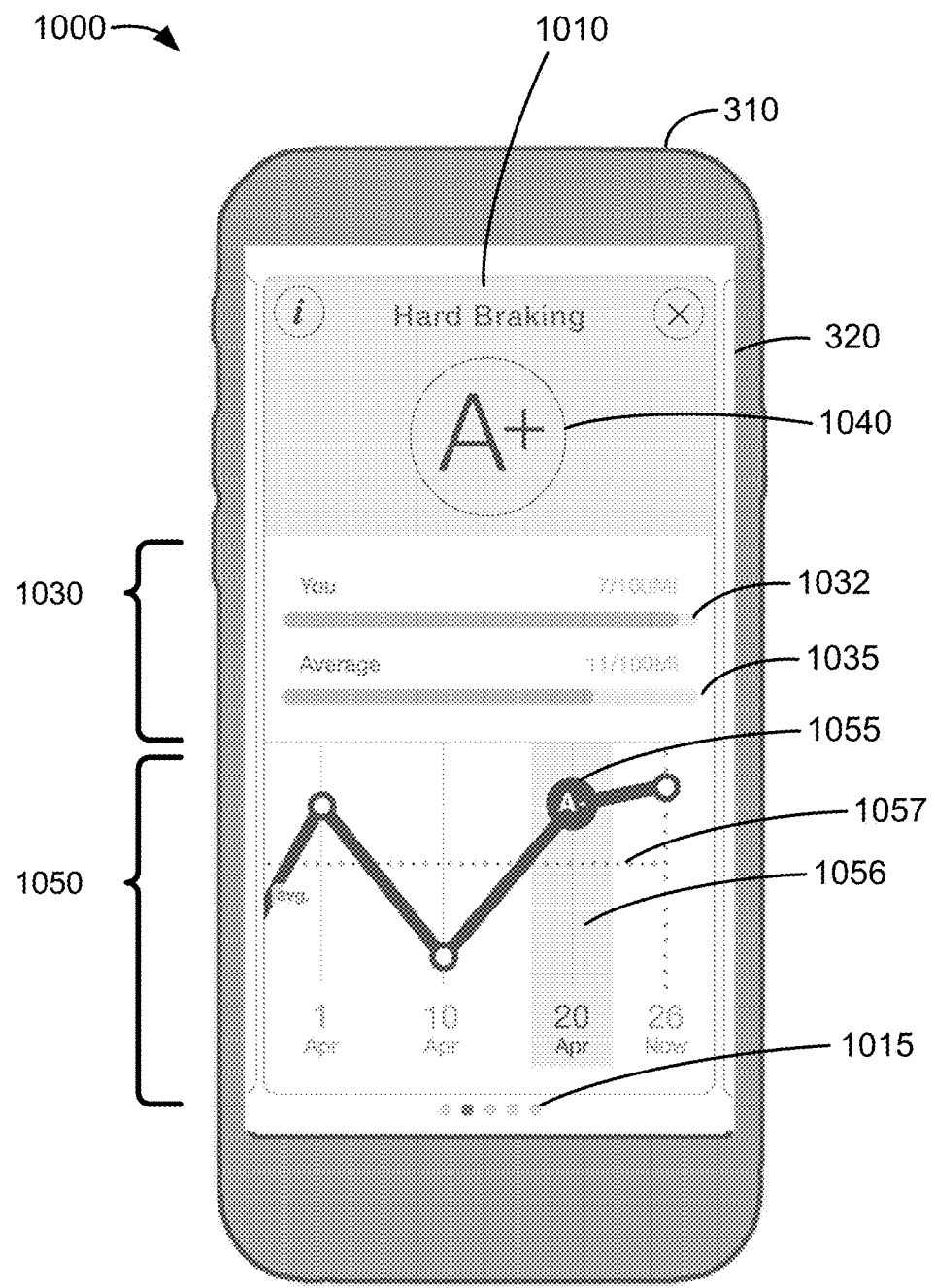
FIG. 10 is an exemplary display presenting hard braking scores and analysis according to an embodiment of the present invention.

FIG. 10 is an exemplary display 320 presenting hard braking scores and analysis according to an embodiment of the present invention. System 1000 includes mobile device 310 having display 320 showing driving behavior card 1010. Driving behavior card 1010 displays score 1040, comparison 1030, and graph 1050. In some embodiments, driving behavior card 1010 can be displayed upon a request for additional detail about how embodiments assess a particular driving behavior. In some embodiments, driving behavior cards 1010 can be scrolled such that each can be viewed, with indicator 1015 showing the progress of scrolling between cards. Other approaches to displaying cards can be used as well.

Driving behavior score 1040 can be similar to the driving behavior score displayed in, for example, the display of behavior scores 330 from FIG. 3 and/or hard braking score 430A from FIG. 4. In some embodiments, additional details can be displayed with driving behavior score 1040, e.g., information about how score 1040 was determined. As discussed above, hard braking can be determined by measuring vehicle deceleration in miles per hour, e.g., in some embodiments, a "hard brake" is a deceleration of greater than 7 miles per hour over a short period of time. With driving behavior score 1040, additional information, such as, for example, the average mile per hour deceleration of a measured hard brake, can be shown with score 1040, or with graph 1050 discussed below. Any different related information may be displayed with driving behavior score 1040 to beneficially inform users of the operation of different embodiments.

In some embodiments, comparison 1030 provides a comparison metric, determined by embodiments, related to driving behavior card 1010. For example, an example driver may have seven (7) hard brakes per one-hundred (100) miles driven ("You" 1032)), and a comparison is shown with other drivers, e.g., eleven (11) hard brakes per one-hundred (100) miles driven ("Average" 1035)). In some embodiments, the number of miles driven metric can change (e.g., greater or less than 100 miles), the number of comparisons shown can increase and/or change (e.g., a demographic can be shown that corresponds to the graded driver (e.g., males, 20-30, unmarried, etc.), or the automobile driven by the graded driver (e.g., drivers of mini-vans)). Other comparisons may also be shown in comparison 1030.

In some embodiments, graph 1050 can display metrics related to driving behavior card 1010 shown over a time period (e.g., as shown in graph 1050, the determined score 1040 for hard braking measured from April 1 through April 26). This graph 1050 can usefully indicate the progression of scoring for a driving behavior over time. In the example shown in graph 1050, each point on the graph represents a week, and a new score is generated for a driving behavior (e.g., hard braking) each week. In some embodiments, score 1040 can be generated at different intervals, e.g., as a running grade that changes after each drive, on a monthly basis and/or any other interval. In some embodiments, threshold 1057 can be shown to give an indication of a quantitative change in behavior (e.g., graph 1050 driving behavior from April 10 to April 20 crossed threshold 1057 and is significantly better on April 20). Any threshold may be implemented with respect to graph 1050, such as an average score for the driving behavior.

In some embodiments, textual and graphical elements can be added to graph 1050 to add additional information, e.g., plotted grade 1055 shows when a grade change (to "A−") occurred. Shading of particular date ranges can be added in some embodiments when significant events occur, e.g., shading 1056 highlighting the grade change indicated by plotted grade 1055.

Figure 11:
FIG. 11 is an exemplary display presenting hard braking scores and analysis with a window offering additional information according to an embodiment of the present invention.

FIG. 11 is an exemplary display 320 presenting hard braking scores and analysis with a window offering additional information according to an embodiment of the present invention. System 1100 uses mobile device 310 having display 320 to display information similar to that described with FIG. 10, and message 1110 can be used to provide information about the data collection, analysis, scoring, transformation, display and/or any other features of embodiments.

Figure 12:
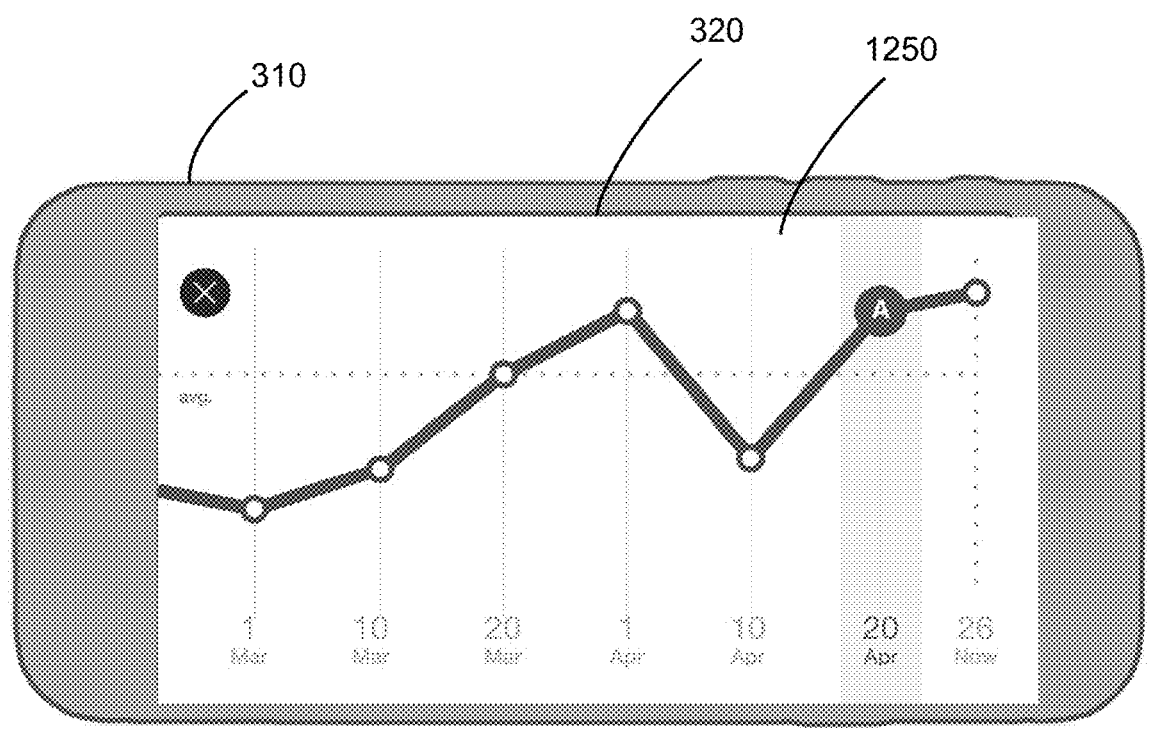
FIG. 12 is an exemplary display presenting a graph showing trends in driving scores according to an embodiment of the present invention.

FIG. 12 is an exemplary display presenting a graph showing trends in driving scores according to an embodiment of the present invention. In some embodiments, a display of graphic data (e.g., graph 1050 from FIG. 10) can be shown in landscape mode when mobile device 310 is held sideways. Graph 1250 may be similar to graph 1050, but has additional information based on the additional space provided in landscape mode. In some embodiments, any other display element shown or described herein can be displayed in different modes, e.g., landscape mode shown in FIG. 12.

Figure 13:
FIG. 13 is an exemplary display presenting data for a specific trip according to an embodiment of the present invention.

FIG. 13 is an exemplary display 320 presenting data for a specific trip according to an embodiment of the present invention. System 1300 includes mobile device 310 with display 320 showing trip card 1350. In an example, trip card 1350 includes a summary section 1310, driving behavior information 1330, and map 1340. As discussed with FIG. 14 below, map 1340 can be used to display transformed driving data in relation to a geographical area. Summary section 1310 includes the start and finish locations (e.g., Sharon to Allston) of the trip, the estimated mode of transportation 1360 (e.g., automobile), the duration of the trip (e.g., 38 minutes), and the distance of the trip (e.g., 28.5 miles). The date and start/stop times of the trip are also shown in summary section 1310.

Trip cards 1350 provide additional information about a collection of driving data (e.g., a collection starting at the beginning of a trip and ending at the end of a trip). FIG. 3, for example, shows multiple trips, and in some embodiments, additional information can be requested about one or more trips. FIG. 5 is a more detailed view of a trip, and the information from FIG. 5 (e.g., trip score 535, mode of transportation 590, distance 570, duration of trip 580, etc.) can be displayed on trip card 1350 (e.g., in summary section 1310), along with additional information.

In some embodiments, driving behavior information 1330 lists out driving events that occurred during the trip, as determined from collected driving data. For example, driving behavior information 1330 shows that, during the Sharon to Allston trip, the driver used a phone function of a mobile device for 3 minutes and 5 seconds, three hard brakes occurred, and the driver was exceeding the posted speed limit (i.e., speeding) for 5 minutes. It is contemplated that different combinations of events can be displayed in this section, with the section being larger to accommodate more items, if needed. In some embodiments, different interface components (e.g., this event section) can be scrolled in different directions (e.g., side to side and/or up and down), to accommodate more displayed data points.

Figure 14:
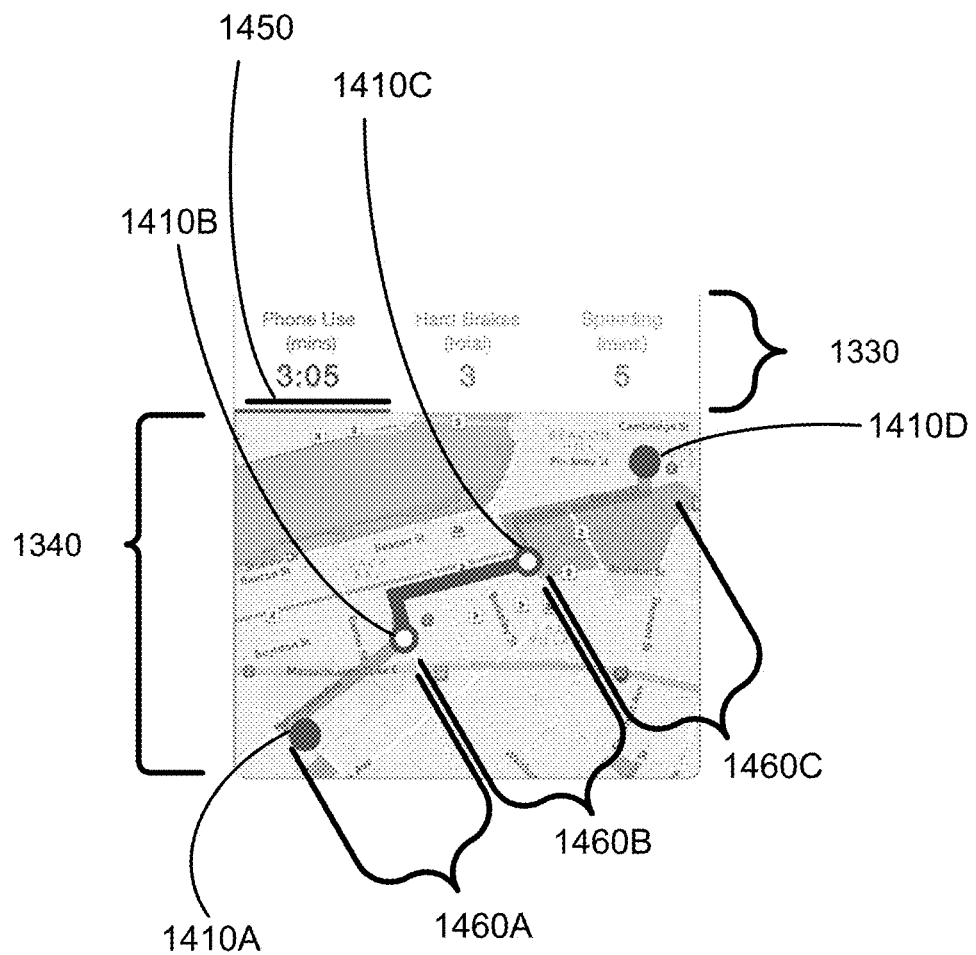
FIG. 14 is an exemplary display presenting a map for a specific trip according to an embodiment of the present invention.

FIG. 14 is an exemplary display presenting a map for a specific trip according to an embodiment of the invention. Map 1340 is a representation of a geographical area over which, in some embodiments, transformed driving data can be displayed. In the example shown on FIG. 14, a trip from point 1410A to 1410D had 3 minutes and 5 seconds of phone use. If more information is desired about this driving behavior, collected driving data can be overlaid over map 1340. In some embodiments, to show the collected driving data associated with an event (e.g., phone use), the event can be selected 1450 and segments of a displayed trip (e.g., from 1410A to 1410D) are highlighted where the event took place. Thus, in FIG. 14, assuming that the detected phone use took place between points 1410B and 1410C, when "phone use" (1450) is selected, trip segment 1460B is highlighted. This approach to displaying driving events can be applied to any event that occurs over a distance, during the trip (e.g., speeding, driving erratically, and/or other similar driving events). Other ways of selecting data to display can also be used by embodiments.

Figure 15:
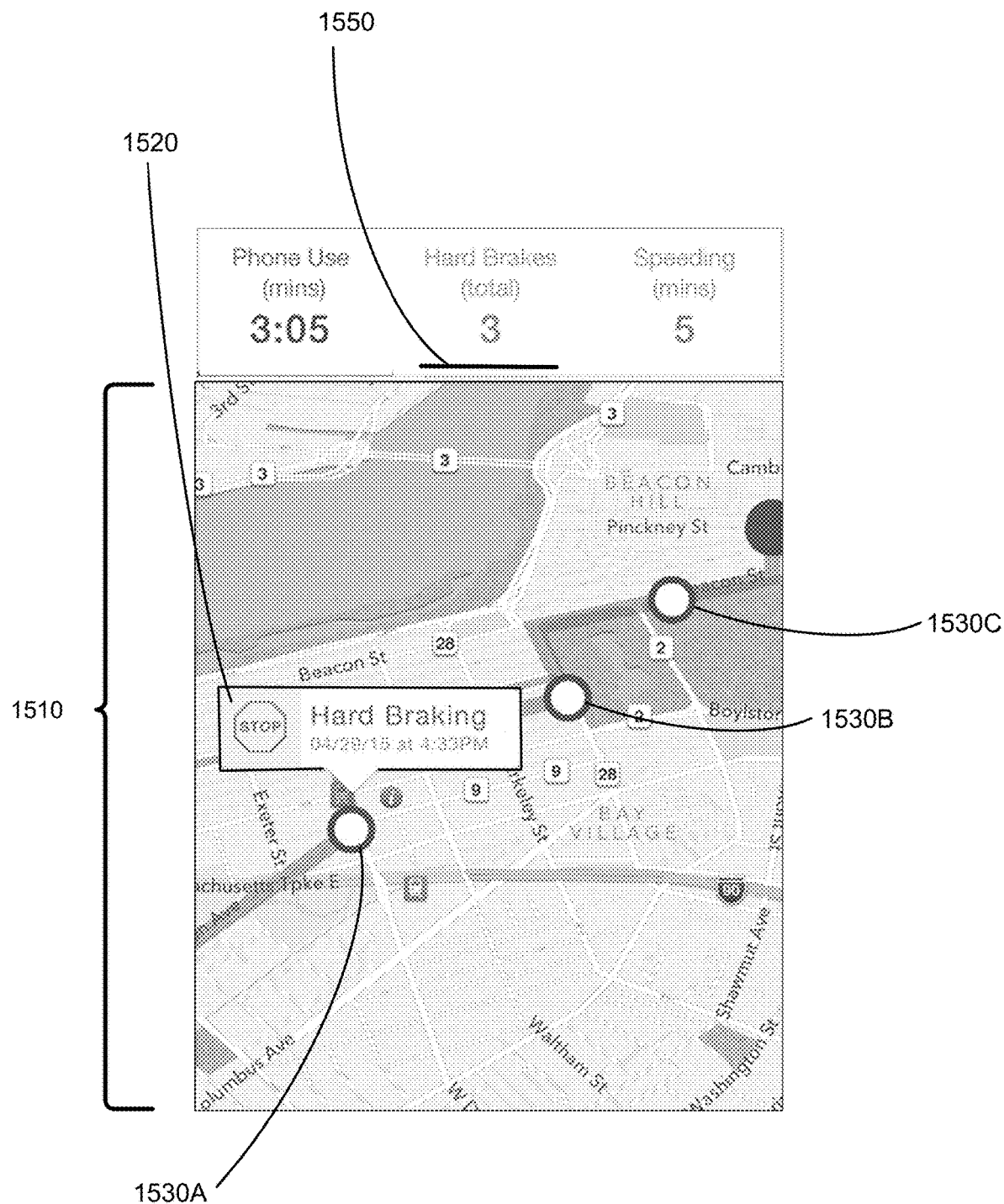
FIG. 15 is an exemplary display presenting a location of a hard braking event on a map for a specific trip according to an embodiment of the present invention.

FIG. 15 is an exemplary display presenting a location of a hard braking event on a map for a specific trip according to an embodiment of the invention. Map 1510 is similar to map 1340 discussed with respect to FIGS. 13 and 14, and displays a sample trip from Sharon to Allston.

For driving events that take place over a shorter distance than phone use (e.g., hard braking, hard cornering, and/or other similar driving events), single points can be used to highlight areas on map 1510. For example, in FIG. 15, assuming that hard braking events occurred at points 1530A, 1530B and 1530C, when hard brakes are selected 1550, these three points can be highlighted by some embodiments. Some embodiments allow points to be selected once displayed, and additional information can be shown in a "pop-up" indicator. For example, upon selection, point 1530A can have a pop-up indicator 1520 displayed that outputs time, date, severity, geographic area (e.g., school zone), and/or contextual data (e.g., weather) associated with the hard braking event.

Some embodiments enable several driving events to be shown on map 1510 at the same time. For example, when both phone use and hard braking are selected from FIG. 15, both trip segment 1460B (phone use), and points 1530A, 1530B and 1530C (hard braking), may be highlighted.

Considering an example using FIGS. 13-15, some embodiments can analyze driving data over multiple trips by the same driver and display significant data points on maps 1340, 1510. In an example where multiple trips are taken on the same route (e.g., from 1410A to 1410D), embodiments can highlight places on maps 1340, 1510 where certain driving behavior occurs repeatedly by the same driver. Thus, if a hard braking event only occurred once at point 1530B, but occurred several times at point 1530A, point 1530A could be highlighted as a geographical spot of interest with respect to this type of driving event for this driver. In addition, pop-up indicator 1520 could list out all the dates and times that this event occurred.

Expanding this multiple trip analysis, some embodiments can analyze data from multiple drivers taking a route and compare the results to the performance of a particular driver. Thus, in an example, if a particular point (e.g., 1410C) is determined to be a frequent point of hard braking for many drivers, this determination can be displayed on maps 1340, 1510, along with the data of the currently analyzed driver. Some embodiments use multiple driver determinations to affect the score assigned to a driver for a particular driving behavior. For example, if many drivers also have hard braking events at a particular point, the score of a driver may not be affected as much for exhibiting the behavior at the particular point. Similarly, if a driver is detected exhibiting a driving behavior that is rare in a particular area, a score may be affected more. One having skill in the relevant art(s), given the description herein, will appreciate how analyzing data for multiple trips and multiple drivers can provide many useful results, including useful points to display and useful ways to score drivers.

Figure 16:
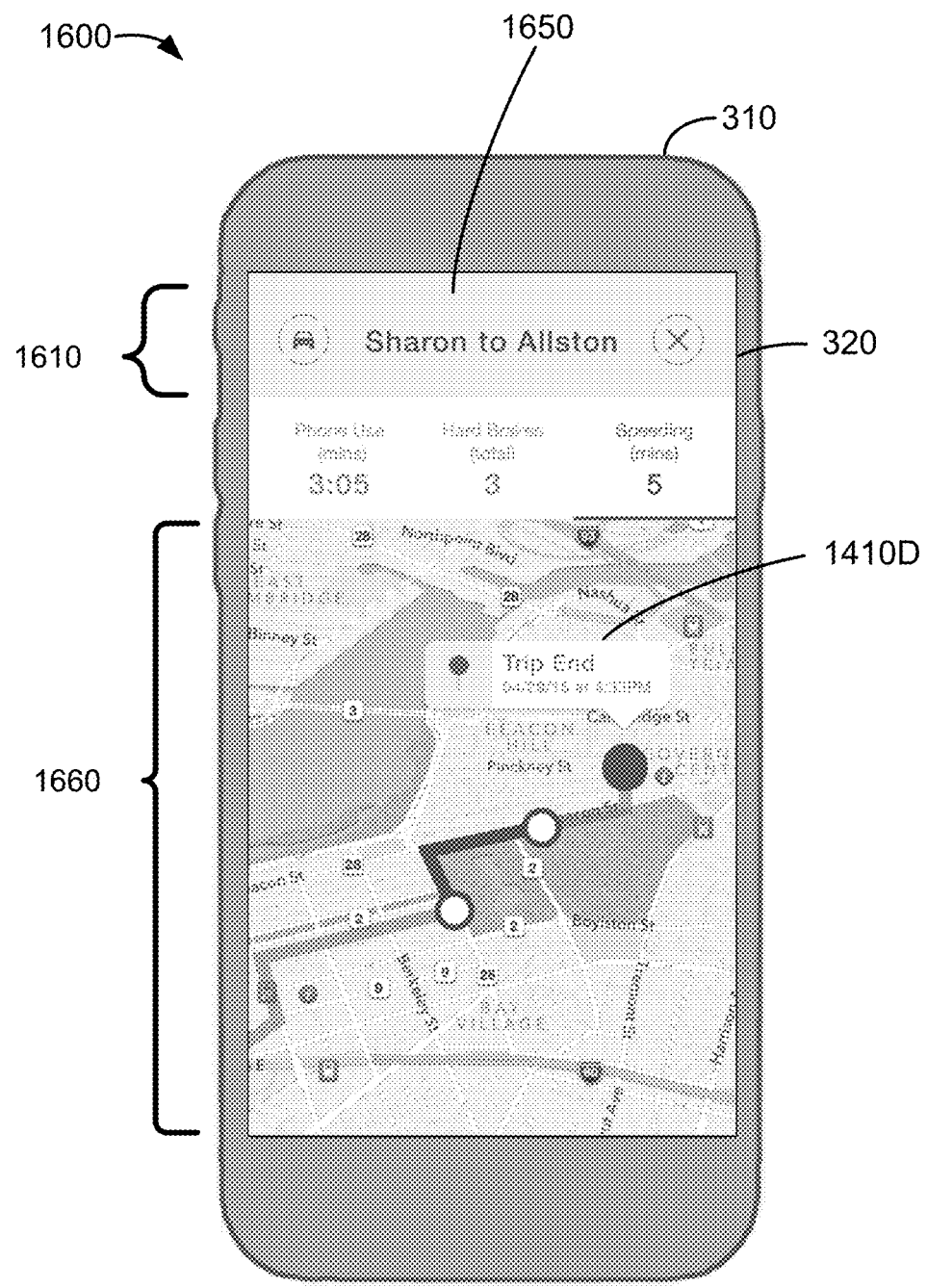
FIG. 16 is an exemplary display presenting a location of a trip end on a map for a specific trip according to an embodiment of the present invention.

FIG. 16 is an exemplary display presenting a location of a trip end on a map for a specific trip according to an embodiment of the present invention. Continuing the example discussed with FIGS. 13-15, system 1600 uses mobile device 310 with display 320 to display a view of a trip card 1650 for a trip from Sharon to Allston (similar to trip card 1350 from FIG. 13). In some embodiments, summary section 1610 displays the starting and ending locations and the estimated mode of transit. This displayed information can give more display space to map 1660 than other embodiments with more information in summary section 1610 (e.g., summary section 1310 from FIG. 13 displays more information, and map 1340 has less display space). In some embodiments, the views shown in FIGS. 13 and 16 can be toggled.

Figure 22:
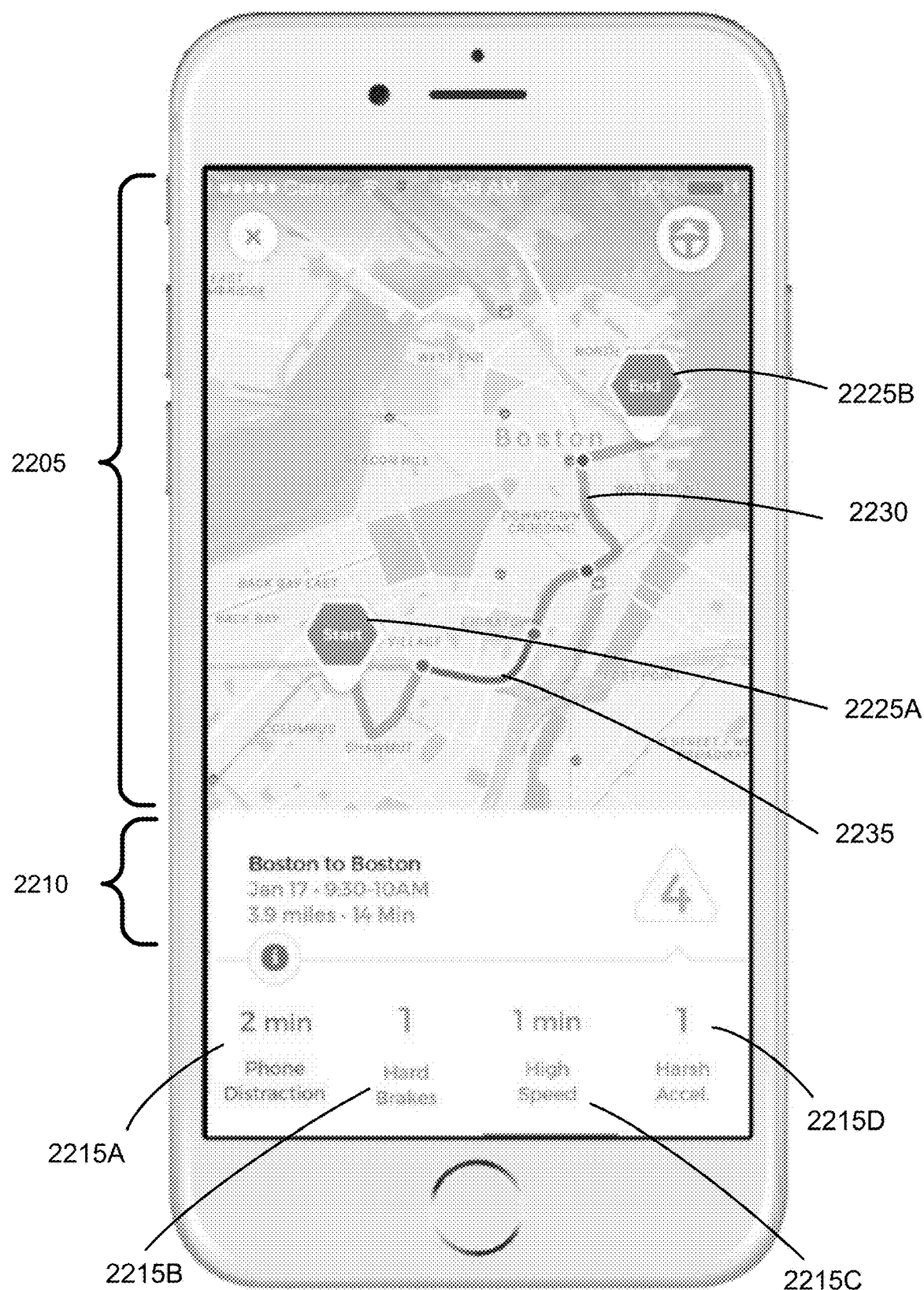
FIG. 22 is an exemplary display presenting a map of a trip and trip metrics according to an embodiment of the present invention.

FIG. 22 is an alternative exemplary display presenting a map of a trip and trip metrics according to an embodiment of the present invention. A trip card 2210 is displayed for a trip from Boston to Boston on January 17 over 14 minutes for 3.9 miles. Driving behaviors metrics 2215A-D are displayed for the trip described by the trip card 2210. Specifically, the driving behavior metrics indicate that the trip included 2 minutes of phone distraction 2215A, 1 hard braking event 2215B, 1 minute of high speed 2215C, and 1 harsh acceleration event 2215D. The trip card 2210 may include a rating 2220 that aggregates some or all of driving behavior metrics 2215A-D. For example, rating 2220 may be "4": "2" for 2 minutes of phone distraction, "1" for 1 hard braking event" and "1" for 1 minute of high speed. Although shown and described as only aggregating certain driving behavior metrics 2215A-D, it is contemplated that rating 2220 may take into account different or all driving behavior metrics 2215A-D. Further, it is contemplated that rating 2220 may also be offset by good driving behaviors in some embodiments.

A map 2205 is also displayed for the trip described by the trip card 2210. Map 2205 displays the starting location 2225A of the trip, the ending location 2225B of the trip, and the route 2230 of the trip. Upon selection of a particular driving behavior metric 2215A-D, map 2205 may also highlight the location along route 2230 that the driving behavior occurred. For example, as shown in FIG. 22, phone distraction 2215A is selected. Thus, segment 2235 of route 2230 is highlighted as being the portion of the trip during which the driver was distracted by the mobile device.

Figure 17:
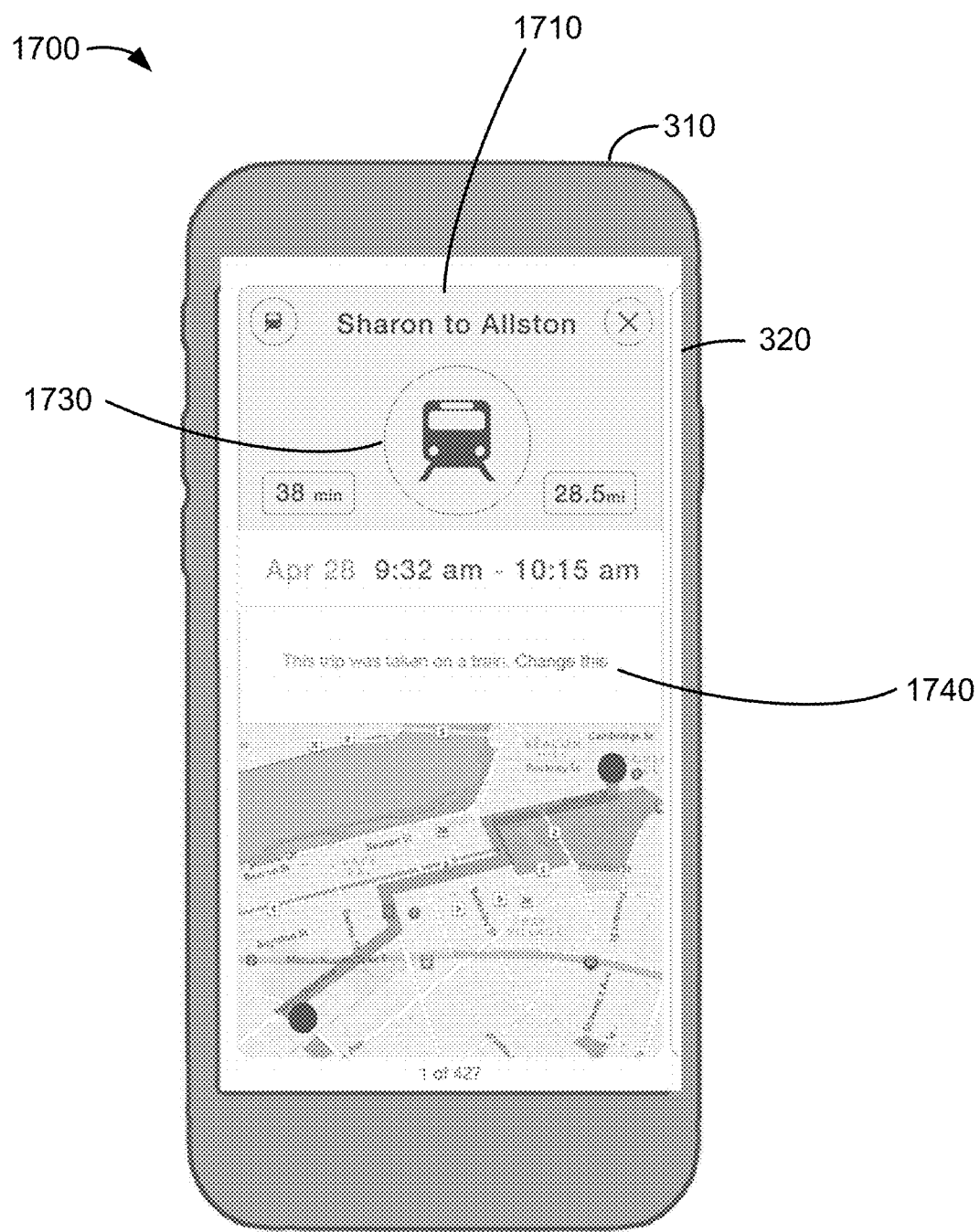
FIG. 17 is an exemplary display presenting data for a train trip according to an embodiment of the present invention.

FIG. 17 is an exemplary display presenting data for a train trip according to an embodiment of the present invention. System 1700 includes mobile device 310 having display 320 showing trip card 1710. Trip card 1710 is similar to trip card 1510 from FIG. 15, with trip data being shown (e.g., duration, starting and ending point, and distance). Trip card 1710 includes a large representation of the determined mode of transit 1730 for the trip. Display 320 also shows question 1740, stating, "This trip was taken on a train. Change this." The mode of transit may be changed, for example, by selecting question 1740.

If a mode of transit was incorrectly determined, in some embodiments, the mode of transit 1730 can be selected, and a list of different transit values can be viewed and selected. Different transit modes are listed in FIG. 6 and described with FIGS. 3-5 above. As discussed above, the '628 Application, provides examples of determining different transportation modes used by some embodiments.

The examples and embodiments described herein are for illustrative purposes only. Various modifications or changes in light thereof will be apparent to persons skilled in the art. These are to be included within the spirit and purview of this application, and the scope of any included claims.

What is claimed is:

1. A method, comprising:
   measuring, by a sensor arrangement of a mobile phone disposed in a vehicle during a drive, movements of the mobile phone, the sensor arrangement being configured to transmit electronic signals to a processor of the mobile phone indicating the movements associated with the mobile phone during the drive;
   receiving, by the processor of the mobile phone, the electronic signals from the sensor arrangement indicating the movements;
   executing, by the processor, an application on the mobile phone during the drive;
   detecting, by the processor, a user interaction with the application during a time interval;
   analyzing, by the processor, the movements measured by the sensor arrangement to classify the movements into a first set of movements caused by a user of the mobile phone and a second set of movements caused by motion of the vehicle;
   detecting, by the processor, a driving event based on the second set of movements;
   storing, by the processor and in a memory of the mobile phone, a focused time metric that is generated for the drive based on the user interaction detected during the time interval, wherein the focused time metric indicates a percentage of the drive in which the user was focused on driving the vehicle;
   storing, by the processor and in the memory, a mobile phone interaction metric that is generated based on the user interaction during the time interval, wherein the mobile phone interaction metric indicates a percentage of the drive in which the mobile phone was in use during the drive;
   detecting, by the processor, a user interaction with an interactive graphical user interface (GUI) presented on a display of the mobile phone for reviewing a summary of the drive; and
   in response to detecting the user interaction with the interactive GUI, causing, by the processor, the display to present a graphical image of the focused time metric, the mobile phone interaction metric, and an indication of the driving event in the interactive GUI.

2. The method of claim 1, wherein detecting the driving event occurs in response to:
   identifying an acceleration threshold; and
   detecting, from the second set of movements, that an acceleration of the vehicle during the time interval exceeded the acceleration threshold.

3. The method of claim 1, wherein detecting the user interaction with the application comprises determining whether the display is displaying an output.

4. The method of claim 1, wherein detecting the user interaction with the application comprises determining whether the mobile phone is unlocked during the time interval.

5. The method of claim 1, wherein detecting the user interaction with the application comprises detecting, from the first set of movements, one or more movements that indicate that a user of the mobile phone is interacting with the display of the mobile phone.

6. The method of claim 1, wherein causing the display to present the graphical image comprises:
   storing, by the processor and in a memory of the mobile phone, an association between the user interaction with the application and a subset of the first set of movements that were measured during the time interval;
   identifying, by the processor, a street map associated with the drive;
   plotting, by the processor, a route of the drive on the street map;
   creating, by the processor, and based on the association stored in the memory of the mobile phone, a label for the subset of the movements; and
   causing the display to present the street map with the route plotted thereon and the label for the subset of the movements in the interactive GUI.

7. The method of claim 6, further comprising:
   receiving a selection of the label via the interactive GUI; and
   causing the display to highlight a subset of the route on the street map that corresponds to the subset of the first set of movements, the focused time metric, and the mobile phone interaction metric.

8. The method of claim 1, further comprising:
   generating, by the processor, at least one driving event score from the first set of movements;
   generating, by the processor, a drive score for the drive using the at least one driving event score;
   aggregating, by the processor, the drive score for the drive and other drive scores associated with other drives for which the sensor arrangement of the mobile phone measured movements;
   generating, by the processor, a driver score for the user using the aggregated drive scores; and
   causing the display to present at least one of the at least one driving event score, the drive score, or the driver score in the interactive GUI.

9. The method of claim 1, wherein the movements are measured over a plurality of time periods during the drive, and classifying the movements into the first set of movements caused by the user of the mobile phone comprises:
   extracting a first subset of movement measurements from the movements that correspond to a first time period of the plurality of time periods;
   determining a first gravity vector associated with the first time period using at least two movement measurements of the first subset of movement measurements;
   extracting a second subset of movement measurements from the movements that correspond to a second time period of the plurality of time periods;
   determining a second gravity vector associated with the second time period using at least two movement measurements of the second subset of movement measurements;
   determining a gravity angle difference or a gravity magnitude difference between the first gravity vector and the second gravity vector;
   determining that the gravity angle difference is above a first threshold or that the gravity magnitude difference is above a second threshold; and
   classifying the first subset of movement measurements and the second subset of movement measurements into the first set of movements caused by the user in response to determining that the gravity angle difference is above the first threshold or that the gravity magnitude difference is above the second threshold.

10. The method of claim 9, wherein classifying the movements into the second set of movements caused by motion of the vehicle comprises:
removing the first subset of movement measurements for the first time period and the second subset of movement measurements for the second time period from the movements to produce remaining movement measurements over remaining time periods, wherein the remaining movement measurements are classified into the second set of movements.

11. The method of claim 10, wherein the remaining movement measurements comprise at least one acceleration measurement, and detecting the driving event comprises:
determining a third gravity vector using the remaining movement measurements;
separating the at least one acceleration measurement into first, second, and third components;
identifying the first component as a vertical acceleration component, wherein the first component is more highly correlated with acceleration projected onto the third gravity vector than the second component or the third component;
identifying the second component as a lateral acceleration component, wherein the second component is more highly correlated with a rotation rate around the third gravity vector than the third component;
identifying the third component as a longitudinal acceleration component; and
determining an acceleration measurement for the vehicle based on the vertical acceleration component, the lateral acceleration component, and the longitudinal acceleration component of the at least one acceleration measurement; and
detecting that the acceleration measurement for the vehicle exceeded an acceleration threshold.

12. The method of claim 10, wherein the remaining movement measurements comprise a first acceleration measurement for a first subset of the remaining time periods and a second acceleration measurement for a second subset of the remaining time periods, and detecting the driving event comprises:
separating the first acceleration measurement into first, second and third components;
separating the second acceleration measurement into fourth, fifth and sixth components;
determining a first mean value for the first component and the fourth component, a second mean value for the second component and the fifth component, and a third mean value for the third component and the sixth component;
determining a first difference between the first mean value and the first component, a second difference between the first mean value and the fourth component, a third difference between the second mean value and the second component, a fourth difference between the second mean value and the fifth component, a fifth difference between the third mean value and the third component, and a sixth difference between the third mean value and the sixth component;
determining a covariance matrix using the first difference, the second difference, the third difference, the fourth difference, the fifth difference and the sixth difference;
determining a plurality of eigenvectors and a plurality of eigenvalues of the covariance matrix;
selecting a first, second and third eigenvalue based on the largest eigenvalues of the plurality of eigenvalues;
identifying first, second and third eigenvectors corresponding to the first, second and third eigenvalues;
associating the first, second and third eigenvectors with a vertical acceleration of the vehicle, a lateral acceleration of the vehicle, or a longitudinal acceleration of the vehicle; and
detecting that the vertical acceleration of the vehicle, the lateral acceleration of the vehicle, or the longitudinal acceleration of the vehicle exceeded an acceleration threshold.

13. The method of claim 1, wherein the sensor arrangement of the mobile phone comprises at least one of an accelerometer, a magnetometer, a gyroscope, a compass, a barometer, or a Global Navigation Satellite System (GNSS) receiver.

14. A computer-program product tangibly embodied in a non-transitory machine-readable storage medium, including instructions that, when executed by one or more processors of a mobile phone disposed in a vehicle during a drive, cause the one or more processors to:
measure, by a sensor arrangement of the mobile phone, movements of the mobile phone, the sensor arrangement being configured to transmit electronic signals to the one or more processors of the mobile phone indicating the movements associated with the mobile phone during the drive;
receive the electronic signals from the sensor arrangement indicating the movements;
execute an application on the mobile phone during the drive;
detect a user interaction with the application during a time interval;
analyze the movements measured by the sensor arrangement to classify the movements into a first set of movements caused by a user of the mobile phone and a second set of movements caused by motion of the vehicle;
detect a driving event based on the second set of movements;
store a focused time metric that is generated for the drive based on the user interaction detected during the time interval, wherein the focused time metric indicates a percentage of the drive in which the user was focused on driving the vehicle;
store a mobile phone interaction metric that is generated based on the user interaction during the time interval, wherein the mobile phone interaction metric indicates a percentage of the drive in which the mobile phone was in use during the drive;
detect a user interaction with an interactive graphical user interface (GUI) presented on a display of the mobile phone for reviewing a summary of the drive; and
in response to detecting the user interaction with the interactive GUI, cause the display to present a graphical image of the focused time metric, the mobile phone interaction metric, and an indication of the driving event in the interactive GUI.

15. The computer-program product of claim 14, wherein detecting the user interaction with the application comprises at least on of:
determining whether the display is displaying an output;
determining whether the mobile phone is unlocked during the time interval; or detecting, from the first set of movements, one or more movements that indicate that a user of the mobile phone is interacting with the display of the mobile phone.

16. The computer-program product of claim 14, wherein causing the display to present the graphical image comprises:
storing, by the processor and in a memory of the mobile phone, an association between the user interaction with the application and a subset of the first set of movements that were measured during the time interval;
identifying, by the processor, a street map associated with the drive;
plotting, by the processor, a route of the drive on the street map;
creating, by the processor, and based on the association stored in the memory of the mobile phone, a label for the subset of the movements;
causing the display to present the street map with the route plotted thereon and the label for the subset of the movements in the interactive GUI;
receiving a selection of the label via the interactive GUI; and
causing the display to highlight a subset of the route on the street map that corresponds to the subset of the first set of movements, the focused time metric, and the mobile phone interaction metric.

17. The computer-program product of claim 14, wherein the instructions further cause the one or more processors to:
generate at least one driving event score from the first set of movements;
generate a drive score for the drive using the at least one driving event score;
aggregate the drive score for the drive and other drive scores associated with other drives for which the sensor arrangement of the mobile phone measured movements;
generate a driver score for the user using the aggregated drive scores; and
cause the display to present at least one of the at least one driving event score, the drive score, or the driver score in the interactive GUI.

18. The computer-program product of claim 14, wherein the movements are measured over a plurality of time periods during the drive, and classifying the movements into the first set of movements caused by the user of the mobile phone comprises:
extracting a first subset of movement measurements from the movements that correspond to a first time period of the plurality of time periods;
determining a first gravity vector associated with the first time period using at least two movement measurements of the first subset of movement measurements;
extracting a second subset of movement measurements from the movements that correspond to a second time period of the plurality of time periods;
determining a second gravity vector associated with the second time period using at least two movement measurements of the second subset of movement measurements;
determining a gravity angle difference or a gravity magnitude difference between the first gravity vector and the second gravity vector;
determining that the gravity angle difference is above a first threshold or that the gravity magnitude difference is above a second threshold; and
classifying the first subset of movement measurements and the second subset of movement measurements into the first set of movements caused by the user in response to determining that the gravity angle difference is above the first threshold or that the gravity magnitude difference is above the second threshold.

19. The computer-program product of claim 18, wherein classifying the movements into the second set of movements caused by motion of the vehicle comprises:
removing the first subset of movement measurements for the first time period and the second subset of movement measurements for the second time period from the movements to produce remaining movement measurements over remaining time periods, wherein the remaining movement measurements are classified into the second set of movements.

20. A system comprising:
a vehicle; and
a mobile phone disposed within the vehicle, the mobile phone comprising:
a sensor arrangement configured to measure movements of the mobile phone during a drive in the vehicle and transmit electronic signals to a processor of the mobile phone indicating the movements associated with the mobile phone, the sensor arrangement comprising:
an accelerometer configured to generate acceleration data;
a display;
a memory storing a set of instructions; and
one or more processors coupled to the sensor arrangement, the display, and the memory, the one or more processors being configured to execute the set of instructions to:
receive the electronic signals from the sensor arrangement indicating the movements;
execute an application on the mobile phone during the drive;
detect a user interaction with the application during a time interval;
analyze the movements measured by the sensor arrangement to classify the movements into a first set of movements caused by a user of the mobile phone and a second set of movements caused by motion of the vehicle;
detect a driving event based on the second set of movements;
store a focused time metric that is generated for the drive based on the user interaction detected during the time interval, wherein the focused time metric indicates a percentage of the drive in which the user was focused on driving the vehicle;
store a mobile phone interaction metric that is generated based on the user interaction during the time interval, wherein the mobile phone interaction metric indicates a percentage of the drive in which the mobile phone was in use during the drive;
detect a user interaction with an interactive graphical user interface (GUI) presented on the display of the mobile phone for reviewing a summary of the drive; and
in response to detecting the user interaction with the interactive GUI, cause the display to present a graphical image of the focused time metric, the mobile phone interaction metric, and an indication of the driving event in the interactive GUI.

* * * * *